(12) United States Patent
Montestruque et al.

(10) Patent No.: US 11,286,175 B2
(45) Date of Patent: Mar. 29, 2022

(54) FLUID STREAM MANAGEMENT SYSTEMS AND METHODS THEREOF

(71) Applicant: EmNet, LLC, South Bend, IN (US)

(72) Inventors: Luis Montestruque, South Bend, IN (US); Timothy P. Ruggaber, South Bend, IN (US); Ruben Kertesz, South Bend, IN (US); Alireza Partovi, Mishawaka, IN (US); Timothy P. Braun, Cassopolis, MI (US); Bryant McDonnell, Newport, KY (US)

(73) Assignee: EMNET, LLC, South Bend, IN (US)

( * ) Notice: Subject to any disclaimer, the term of this patent is extended or adjusted under 35 U.S.C. 154(b) by 332 days.

(21) Appl. No.: 16/488,602

(22) PCT Filed: Mar. 7, 2018

(86) PCT No.: PCT/US2018/021422
§ 371 (c)(1),
(2) Date: Aug. 26, 2019

(87) PCT Pub. No.: WO2018/165349
PCT Pub. Date: Sep. 13, 2018

(65) Prior Publication Data
US 2020/0010336 A1 Jan. 9, 2020

Related U.S. Application Data

(60) Provisional application No. 62/468,374, filed on Mar. 8, 2017.

(51) Int. Cl.
*C02F 1/00* (2006.01)
*G01W 1/10* (2006.01)
(Continued)

(52) U.S. Cl.
CPC ............ *C02F 1/006* (2013.01); *G01W 1/10* (2013.01); *G06F 17/10* (2013.01); *G06N 3/02* (2013.01);
(Continued)

(58) Field of Classification Search
CPC ............ C02F 1/006; C02F 2209/001; C02F 2209/003; C02F 2209/40; G06F 17/10;
(Continued)

(56) References Cited

U.S. PATENT DOCUMENTS 6,408,227 B1 * 6/2002 Singhvi .................. C02F 1/008
700/266
2010/0126433 A1 * 5/2010 Kozaki ..................... F22D 5/30
122/451 R
(Continued)

FOREIGN PATENT DOCUMENTS

CN 105372995 A 3/2016
EP 1376276 A1 1/2004
(Continued)

OTHER PUBLICATIONS

International Search Report and Written Opinion of International Application No. PCT/US2018/021422, dated Jun. 20, 2018, 12 pages.
(Continued)

*Primary Examiner* — Kenneth M Lo
*Assistant Examiner* — Christopher W Carter
(74) *Attorney, Agent, or Firm* — EcoTech Law Group, P.C.

(57) ABSTRACT

Fluid stream management systems and methods relating thereto are described. The fluid management system includes a neural network, which comprises: (i) an input layer that is communicatively coupled to one or more fluid facility sensors and/or one or more pre-processing flow
(Continued)

sensors such that one or more of the flow condition attribute values are received the neural network; (ii) one or more intermediate layers, which are configured to constrain one or more of the flow condition attribute values to arrive at modified flow condition attribute values; (iii) an output layer, which transmits, one or more modified flow condition attribute values to a downstream control device. This control device and other computation devices perform certain calculations that ultimately inform a flow controller, which in turn, instructs a flow-directing device regarding management of fluid streams.

25 Claims, 9 Drawing Sheets

(51) Int. Cl.
  *G06F 17/10*    (2006.01)
  *G06N 3/02*    (2006.01)
  *H04L 67/125*    (2022.01)

(52) U.S. Cl.
  CPC ...... *H04L 67/125* (2013.01); *C02F 2209/001* (2013.01); *C02F 2209/003* (2013.01); *C02F 2209/40* (2013.01)

(58) Field of Classification Search
  CPC ......... G01W 1/10; G06N 3/02; H04L 67/125; G05D 7/0635; E03F 3/02
  See application file for complete search history.

(56) References Cited

U.S. PATENT DOCUMENTS

| | | |
|---|---|---|
| 2014/0052422 A1 | 2/2014 | Wan et al. |
| 2016/0378123 A1 | 12/2016 | Montestruque et al. |

FOREIGN PATENT DOCUMENTS

| | | | |
|---|---|---|---|
| KR | 10-0736877 B1 | 7/2007 | |
| KR | 10-1146207 B1 | 5/2012 | |
| KR | 10-1685179 B1 | 12/2016 | |
| WO | 2015121640 A1 | 8/2015 | |
| WO | WO-2016073725 A1 * | 5/2016 | ............ C02F 1/5209 |

OTHER PUBLICATIONS

Extended European Search Report for EP Application No. 18764436.4 dated Dec. 4, 2020, 3 Pages.

* cited by examiner

FLUID STREAM MANAGEMENT SYSTEMS AND METHODS THEREOF

RELATED APPLICATION

This application claims the benefit from International Application No. PCT/US2018/021422, which was granted an International filing date of Mar. 7, 2018, which in turns claims priority from U.S. Provisional Application having Ser. No. 62/468,374, filed on Mar. 8, 2017, which are incorporated herein by reference for all purposes.

FIELD

The present teachings generally relate to systems and methods of managing fluid collection and conveyance systems. More particularly, the present teachings relate to fluid stream management systems and methods thereof well suited for sewer system, waste-water treatment systems and the like.

BACKGROUND

A sewer system collects, transports, treats and/or dispenses fluid. To that end, the sewer system may include a network of interconnected trunk lines or pipes for directing fluid flow within the sewer system. Additionally, sewer systems may include various components to treat and/or store the fluid. Managing complicated arrangements of these components poses unique challenges that remain unsolved by the prior art.

What are, therefore, needed are novel systems and methods that are employed for effective sewage management.

SUMMARY

To achieve the foregoing, the present teachings provide novel systems and methods for effective management of water collection and conveyance systems. The present systems and methods rely on novel arrangements of components used in water collection and conveyance systems, to control transport, storage and treatment of fluid streams.

In one aspect, the present arrangements provide a fluid stream management system. An exemplar fluid stream management system of this aspect includes: (i) one or more downstream processing sub-systems, each of which is associated with one or more fluid facilities; (ii) one or more upstream processing sub-systems; (iii) one or more neural networks; and (iv) one or more fluid flow controllers.

At least one downstream processing sub-system further includes: (i) one or more fluid facility sensors; (vi) one or more pre-processing flow sensors; and (ii) one or more downstream control devices. One or more fluid facility sensors facilitate determination of one or more flow condition attribute values of one or more of the associated fluid facilities. A flow condition attribute value provides information regarding processing of a fluid stream. By way of example, the flow condition attribute value provides information regarding at least one of transport, storage and treatment of one input fluid streams inside a fluid facility. One or more pre-processing flow sensors facilitate determination of one or more flow condition attribute values of one or more of the input fluid streams prior to entering (of the input fluid stream(s)) one or more of the associated fluid facilities.

The downstream control device is configured to compute, based on one or more of the flow condition attribute values obtained using one or more of the fluid facility sensors and/or one or more of the pre-processing flow sensors, a load value for each of one or more of the associated fluid facilities. The load value may convey a measure of utilization of a fluid facility. In other words, load values may refer to values related to utilized capacity of one or more fluid facilities (e.g., transport, storage and treatment of one or more fluid streams inside one or more fluid facilities).

One or more upstream processing sub-system includes: (i) one or more flow-directing devices, each of which is configured to direct and/or adjust flow of one or more input fluid streams into two or more fluid facilities; and (ii) one or more upstream processors, each of which is configured to compute a total load value for each of two or more fluid facilities. One fluid facility is a proximate fluid facility, which is proximate to one or more of the flow-directing devices and another fluid facility is a distant fluid facility, which is distant to one or more of the flow-directing devices. The total load value of a fluid facility, such as a proximate fluid facility, refers to a product of the load value of the fluid facility (e.g., the proximate fluid facility) and a sum of one or more flow condition attribute values of one or more fluid streams flowing in the fluid facility (e.g., the proximate fluid facility).

One or more of the neural networks includes: (i) an input layer; (ii) one or more intermediate layers; and (iii) an output layer. The input layer is communicatively coupled to one or more of the fluid facility sensors and/or one or more of the pre-processing flow sensors such that one or more of the flow condition attribute values of one or more of the fluid facilities and/or one or more of the flow condition attribute values of one or more of the input fluid streams are received at one or more of the neural networks.

One or more of the intermediate layers is configured to compute one or more modified fluid condition attribute values of one or more of the fluid facilities (e.g., the distant fluid facility). The modified flow condition attribute values account for changes in values of one or more fluid condition attributes, as a function of time, of one or more of the fluid facilities and of one or more of the input fluid streams entering the fluid facilities.

The output layer that is communicatively coupled to one or more of the downstream control devices such that the one or more of the modified fluid condition attribute values of one or more of the fluid facilities (e.g., the distant fluid facility) is conveyed to one or more of the downstream control devices. The downstream control device computes, based on one or more of the modified fluid condition attribute values, a modified load value for each of one or more fluid facilities. One or more upstream control devices calculate, based on the modified load value, a modified total load of each of the fluid facilities. The modified total load refers to a product of the modified load value and a sum of one or more modified fluid condition attributes values of one or more of the input fluid streams flowing into the fluid facility (e.g., the distant fluid facility).

Each fluid flow controller is coupled to both one or more of the downstream processing sub-systems and one or more of the upstream processing sub-systems and coupled to at least one or more of the flow-directing devices. During an operative state of the fluid flow controller, the fluid flow controller adjusts fluid flow through one or more of the flow-directing devices to minimize a sum of at least one of the total load value of the proximate fluid facility and at least one of the modified total load value of the distant fluid facility. In one embodiment of the present arrangements, one or more of the fluid flow controllers are integrated into a single upstream processing sub-system.

In one embodiment of the present teachings, a flow condition attributes is an attribute selected from a group comprising fluid flow rate, fluid height, fluid volume, hydraulic capacity, time of fluid retention, storage capacity, and fluid quality. The flow-directing device may be selected from a group comprising fluid facility, fluid pump station, gate, inflatable dam, weir, and valve. Fluid facilities may be of different types. In one embodiment of the present arrangements, a fluid facility is selected from a group comprising storage tank, trunk line, fluid treatment plant, holding pool, reservoir, ocean, and river. The fluid facility sensors and/or the pre-processing flow sensors include at least one sensor selected from a group comprising level sensors, flow meter, thermometer, dissolved oxygen sensor, pH level sensor, conductivity sensor, oxidation reduction potential sensor, $E.\ coli$ count sensor, total organic carbon level sensor, nitrate level sensor, phosphorus level sensor, bacteria count sensor.

The present teachings recognize that two or more flow-directing devices may be arranged sequentially such that second of the flow-directing device that is located downstream from the first flow-directing device and that in this configuration, the second of the flow-directing device is deemed as a fluid facility by the downstream control device when computing one or more of the load values and/or one or more of the modified load values for each of the associated fluid facilities.

In one embodiments of the present arrangements, one or more of the downstream control devices are not integrated with, and are discrete from, others of the downstream control devices and each of the upstream processors. In such a configuration, one or more of the downstream control devices operate to implement a distributed control scheme. Operation of each of the downstream processing sub-systems and associated ones of the fluid facilities are locally controlled by associated ones of the downstream control devices, and are not controlled by a single centralized control mechanism, others of the downstream control devices, or one or more of the upstream processing sub-systems.

In another embodiment of the present arrangements, one or more of the downstream control devices compute the load value for each of one or more of the associated fluid facilities, without receiving direct input from the single centralized control mechanism, others of the downstream control devices and each of the upstream processors.

In one embodiment of the present arrangements, the fluid stream management system further includes a wireless network, which communicatively couples one or more of the downstream control devices and one or more of the upstream processors. The wireless network facilitates transfer of one or more of the load values and/or of the modified load values from one or more of the downstream control devices to one or more of the upstream processors.

One of the fluid flow controllers may be a proportional integral derivative controller that adjusts flow through a valve, which functions as the flow-directing device, to minimize a sum of at least one of the total load value of the proximate fluid facility and at least one of the modified total load value of the distant fluid facility.

One or more of the neural networks may be collocated with a component of the fluid stream management system. By way of example, one or more of the neural networks is collocated with one of one or more of the downstream control devices. In this configuration, one of the downstream control devices receives, from the collocated neural networks, the modified fluid condition attribute values and computes the modified load value for each of the distant fluid facilities.

The input layer of the neural network may be configured to receive other information in addition to flow condition attribute values. By way of example, the neural network is also communicatively coupled to a weather forecast information provider, such that one or more of the neural networks receive weather forecast information. In another example, the input layer and the output layer of the neural network are communicatively coupled through a connection, such that the input layer receives the modified fluid condition attribute values conveyed from the output layer.

The fluid stream management system may further include a fluid management memory, which is coupled to the output layer and the input layer. One or more of the modified fluid condition attribute values obtained from the output layer may be stored in the fluid management memory and subsequently provided to the input layer of the neural network. In another embodiment, the fluid management memory of the present arrangements is coupled to the input layer and one or more of the fluid facility sensors and/or one or more of the pre-processing flow sensors. During an operative state of the fluid stream management system, historical fluid condition attribute values, obtained from one or more of the fluid facility sensors and/or one or more of the pre-processing flow sensors, may be subsequently received at the input layer.

Certain embodiments of the present arrangements do not include a flow-directing device and an upstream processor or an upstream processing subsystem.

In another aspect, the present teachings provide methods for controlling transport of a fluid stream. Exemplar methods of this aspect include: (i) receiving, using a distant fluid facility sensor, a distant flow condition attribute value for a distant fluid facility; (ii) receiving, using a proximate fluid facility sensor, a proximate flow condition attribute value for a proximate fluid facility, which is proximate to a flow-directing device relative to the distant fluid facility; (iii) receiving, using one or more pre-processing flow sensors, a pre-processing flow condition attribute value for one or more input fluid streams entering the distant fluid facility; (iv) calculating, using a downstream control device and based upon the proximate flow condition attribute value, a load value of the proximate fluid facility; (v) arriving, using a neural network and based upon the distant flow condition attribute value and the distant pre-process flow condition attribute value, a modified flow condition attribute value for the distant fluid facility and that accounts for changes in values of fluid condition attributes, as a function of time, of the distant fluid facility and of one or more of the input fluid streams entering the distant fluid facility; (vi) calculating, using a downstream control device and based upon the modified flow condition attribute value, a modified load value of the distant fluid facility; (vii) determining, using an upstream processor, a total load value for the proximate fluid facility, which refers to a product of the load value of the proximate fluid facility and a sum of one or more of the fluid condition attributes values of one or more of the input fluid streams flowing into the proximate fluid facility; (viii) computing, using the upstream processor, a modified total load value for the distant fluid facility, which refers to a product of the load value of the distant fluid facility and a sum of one or more of the modified fluid condition attributes values of one or more of the input fluid streams flowing into the distant fluid facility; and (ix) adjusting, using a fluid flow controller that is communicatively coupled to a flow-directing device, fluid flow through the flow directing device to minimize a sum of the total load value of the proximate fluid facility and the modified total load value of the distant fluid facility.

In the method above, a plurality of flow condition attribute values (e.g., proximate flow condition attribute values, distant flow condition attribute values or distant pre-processing flow condition attribute values), a plurality of modified flow condition attribute values, a plurality of load values, a plurality of total load values, a plurality of modified load values and a plurality of modified total load values are similarly obtained and/or computed.

The method for controlling transport of a fluid stream may further include: receiving (i) one or more historical modified fluid condition attribute values; (ii) forecast information from a weather forecast information provider; and/or (iii) one or more distant fluid condition attribute values and/or distant pre-processing flow condition attribute values. This information is, preferably, used in arriving at the modified flow condition attribute values for the distant fluid facility, as it may be a more accurate method in certain instances.

The system and method of operation of the present teachings and arrangements, however, together with additional objects and advantages thereof, will be best understood from the following descriptions of specific embodiments when read in connection with the accompanying figures.

DETAILED DESCRIPTION OF THE DRAWINGS

In the following description, numerous specific details are set forth in order to provide a thorough understanding of the present teachings and arrangements. It will be apparent, however, to one skilled in the art that the present teachings and arrangements may be practiced without limitation to some or all of these specific details. In other instances, well-known process steps have not been described in detail in order to not unnecessarily obscure the present teachings and arrangements.

Figure 1:
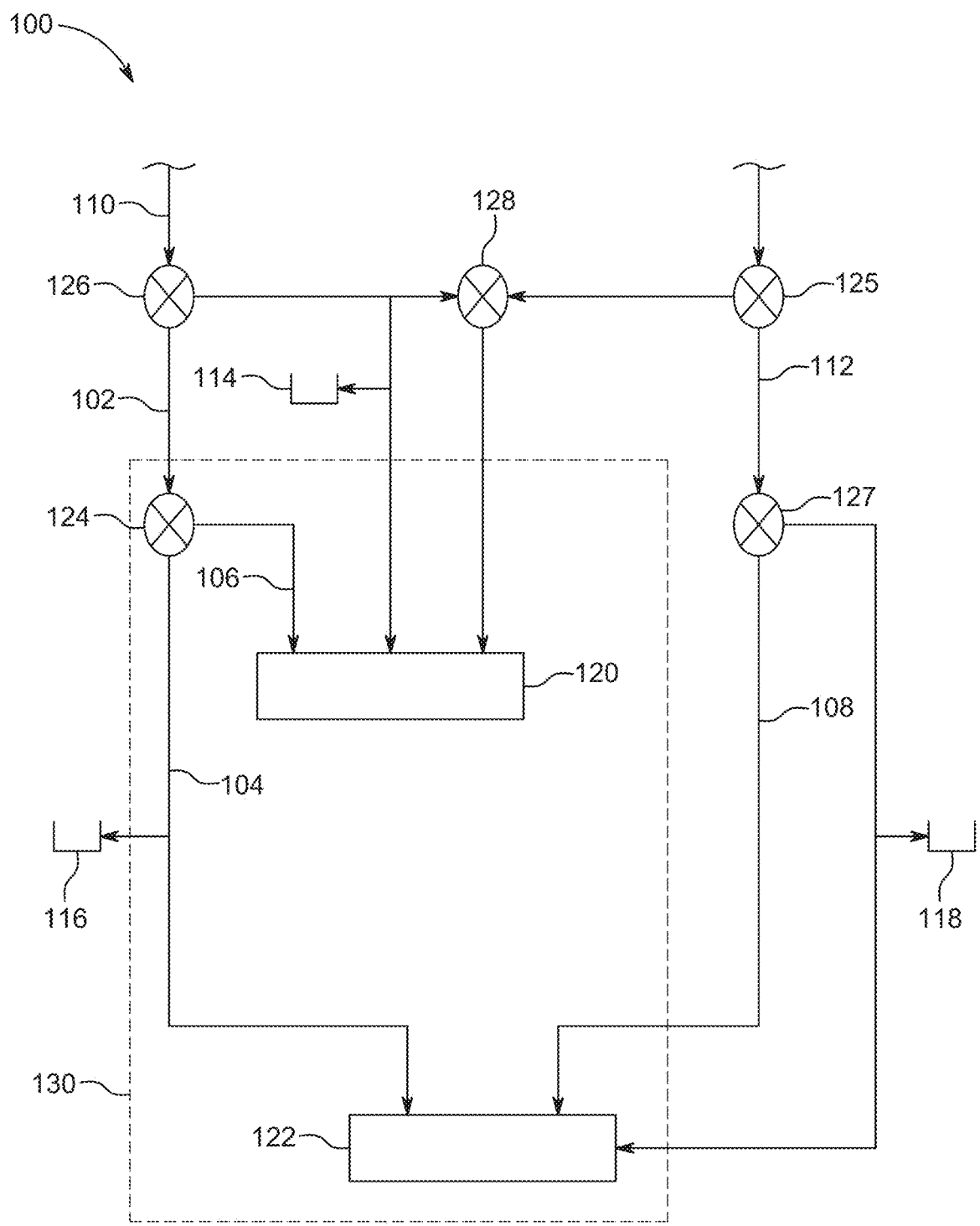
FIG. 1 shows a schematic of a sewer system, according to one embodiment of the present arrangements and that has one or more trunk lines, fluid flow-directing devices ("flow-directing device"), and fluid facilities for transporting, storing and/or treating fluid to or inside the sewer system.

FIG. 1 shows an exemplar sewer system 100 for transporting, storing and/or treating fluid (e.g., wastewater and precipitation). Sewer system 100 includes one or more trunk lines or pipes (e.g., trunk lines or pipes 102, 104, 106, 108, 110, and 112) that transfer fluid between various components, which are coupled to one or both ends of each trunk line. Other components inside sewer system 100 may include one or more fluid treatment facilities 114, 116, 118, 120, and 122. One or more of these fluid treatment facilities may be of a first type 114, 116, 118 (e.g., a tank) or may be of a second type 120, and 122 (e.g., waste water treatment plant). Sewer system 100 may also include one or more fluid flow directing devices (hereinafter "flow-directing devices") 124, 125, 126, 127, and 128. The combination of one or more trunk lines 102, 104, 106, 108, 110, and 112, one or more flow-directing devices 124, 125, 126, 127, 128, and one or more fluid facilities 114, 116, 118, 120, and 122 allows sewer system 100 to transport fluid throughout sewer system 100 for transportation, storage and/or treatment. By way of example, an effluent fluid stream from trunk line 102 is received at flow-directing device 124, Further, at the flow-directing device 124, the fluid stream is directed to any one or both of downstream trunk lines 104 and 106 that ultimately convey one or more fluid streams to one or both of fluid facilities 122 and 120, respectively. These fluid facilities are designed to process, e.g., transport, store and treat, the fluid streams that they receive and their ability process varies with time. Moreover, each of these fluid facilities has varying processing capacities relative to each other. For example, fluid facility 122 may be able to treat a larger volume of fluid than fluid facility 120 at a given instance in time. In connection with a fluid facility, the term "load value," as used herein, conveys a measure of utilization capacity available for a per unit volume of fluid to be processed at the fluid facility.

Figure 2:
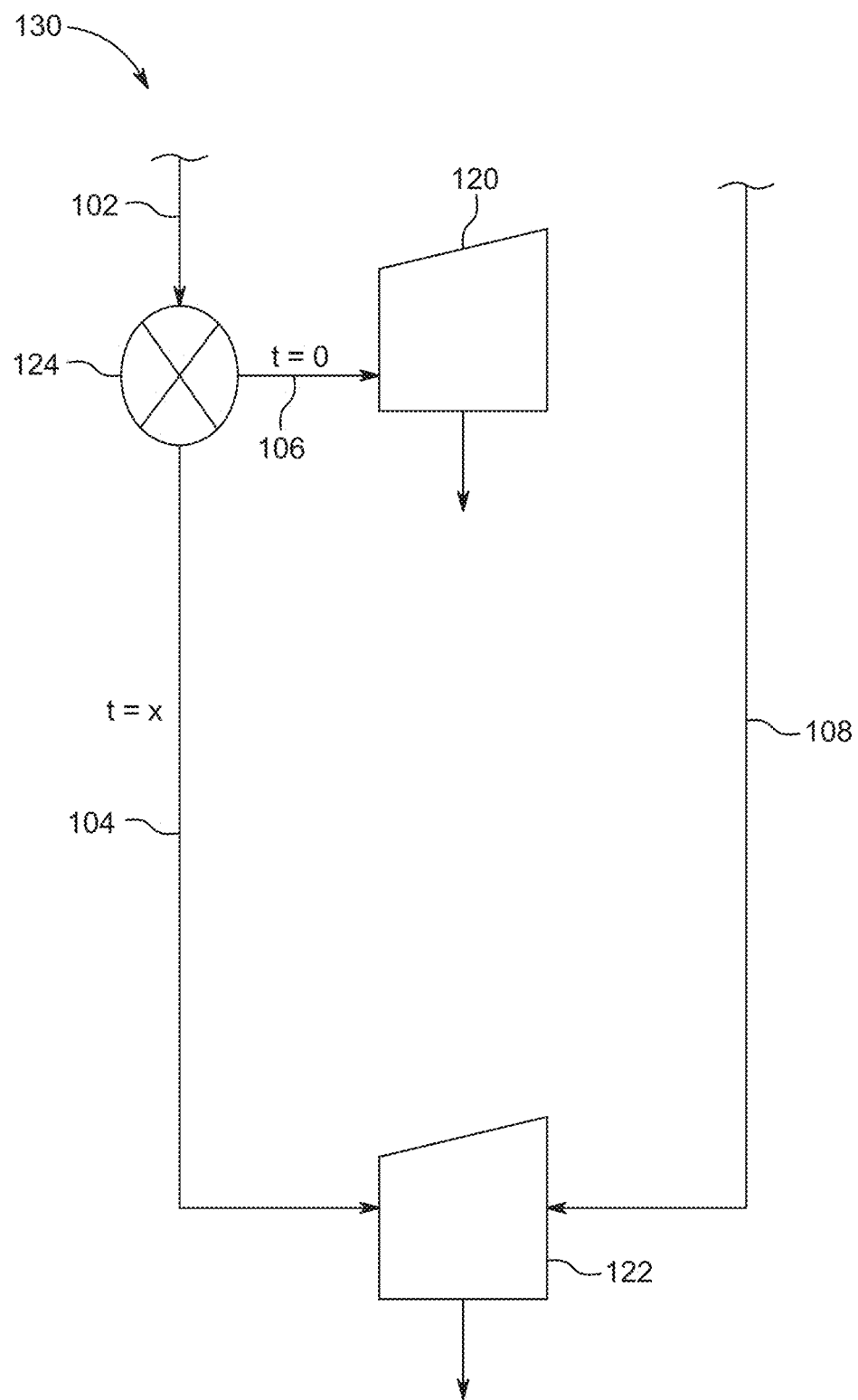
FIG. 2 shows a schematic of a portion of the sewer system of FIG. 1 that includes a flow-directing device, which is capable of directing fluid flow to either a proximate fluid facility or a distant fluid facility, where the distant fluid facility is farther away from the flow-directing device than the proximate fluid facility.

FIG. 2 shows a portion of the sewer system shown in FIG. 1 and that includes flow-directing device 124. According to FIG. 2, flow-directing device 124 is capable of directing fluid to any one or both of fluid facilities 120 and 122 based on the load value of that fluid facility. Fluid facility 120 is in close proximity, relative to fluid facility 120, to flow-directing device 124, and is therefore referred to as a "proximate fluid facility." It may take a time, t, for fluid to flow from flow-directing device 124 to proximate fluid facility 120 is a negligible value, e.g, a few minutes. Conversely, fluid facility 122 is distant, relative to fluid facility 120, and is therefore referred to as a "distant fluid facility," and it takes a time of x value for the fluid released from flow-directing device 124 arrive at distant fluid facility 122. In other words, relative to proximate fluid facility 120, there is a time duration of "x" value between when flow-directing device 124 directs fluid to distant fluid facility 122 and when distant fluid facility 122 receives the fluid. A value of time duration, x, may be in the order of tens or hundreds of minutes.

As explained above, the load value of distant fluid facility 122 changes as a function of time. Such changes in load value may occur depending on the rate of processing of a fluid stream inside distant fluid facility 122, and/or if another fluid stream arrives, at a future instance in time, at distant fluid facility 122 for processing. To this end, FIG. 2 shows that distant fluid facility 122 is also capable of processing a fluid stream arriving via trunk line 108 and the fluid stream may be undergoing processing currently and/or at some future instance in time. The present teachings recognize that, when deciding to and deciding on the volume to direct a fluid stream to distant fluid facility 122, flow-directing device 124 should be able to account for loads, as a function of time, placed by the fluid streams from trunk line 108 on distant fluid facility 122.

Conventional sewer management systems are simply unable to effectively predict load values for distant fluid facility 122. In sharp contrast, the present teachings and arrangements recognize that specifically monitoring flow condition attributes of the fluid stream as a function of time allows effective prediction of load values for any facility, regardless of whether proximate or distant. Examples of flow condition attributes of a fluid stream include fluid flow rate, fluid level, fluid volume, duration of fluid retention, and fluid quality.

Figure 3:
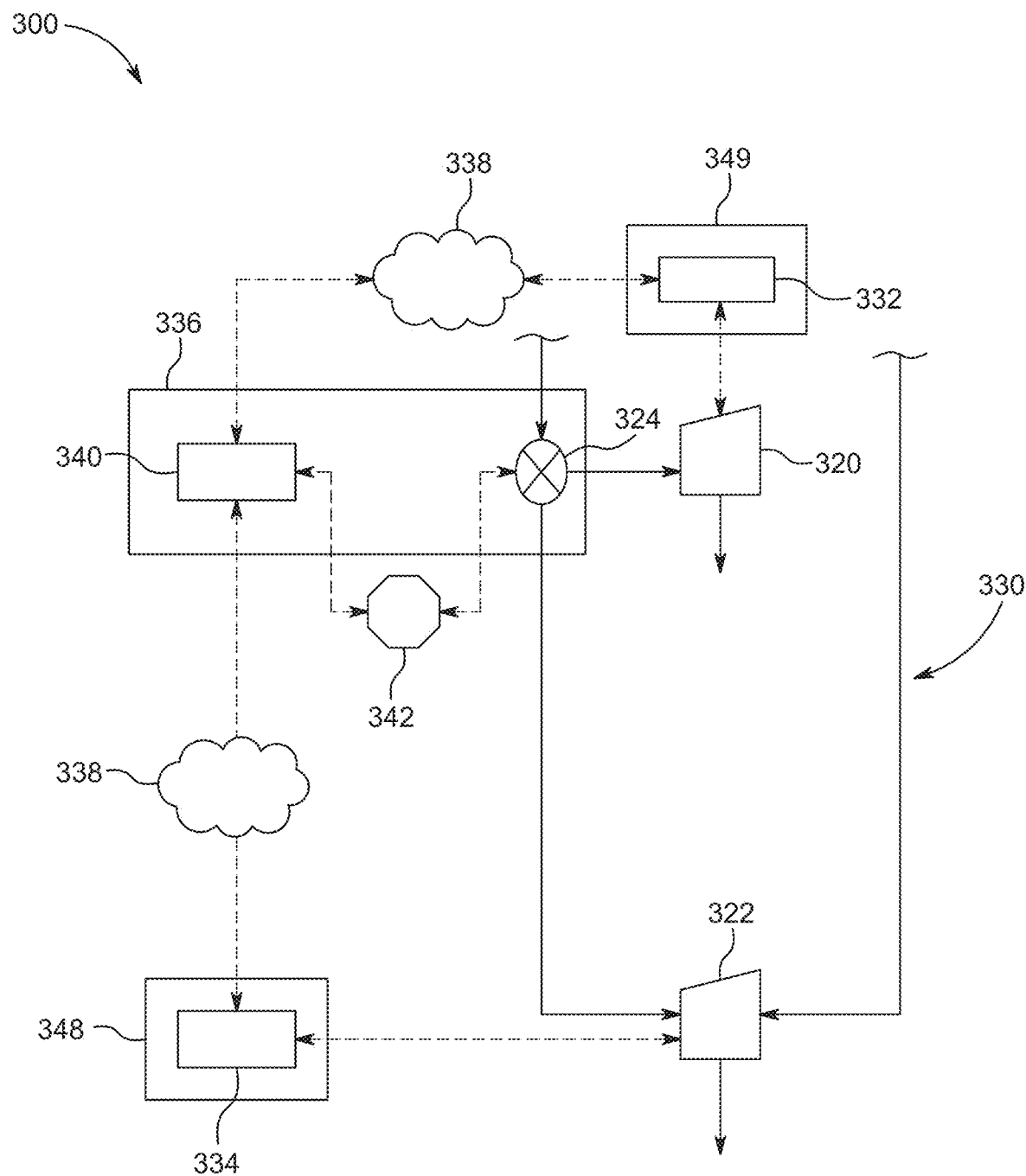
FIG. 3 shows a block diagram of a fluid stream management system, according to one embodiment of the present arrangements and that controls fluid flow through the portion of the sewer system shown in FIG. 2.

FIG. 3 shows a block diagram of a fluid stream management system 300, according to one embodiment of the present arrangements, which includes a portion of sewer system 330. Certain components of fluid stream management system 300, described below direct fluid flow to a proximate fluid facility 320 and/or a distant fluid facility 322. Portion of sewer system 330, is substantially similar to portion of sewer system 130 of FIG. 1 (i.e., flow-directing device 324, proximate fluid facility 320, and distant fluid facility 322 of FIG. 2 are substantially similar to their counterparts flow-directing device 124, proximate fluid facility 120, and distant fluid facility 122 in FIG. 1).

Fluid stream management system 300 of FIG. 3 includes an upstream processing sub-system 336 communicatively coupled to downstream processing sub-systems 348 and 349. In this embodiment of the present arrangements, upstream processing sub-system 336 may include an upstream processor 340 and flow-directing device 324. In other embodiments of the present arrangement, flow-directing device 324 belongs to portion of sewer system 330, and is not part of upstream processing sub-system 336. Regardless of where flow-directing device 324 belongs, a fluid flow controller 342 is communicatively coupled to both upstream processor 340 and flow-directing device 324. Fluid flow controller 342 is a control component, in fluid stream management system 300, that controls the operation of flow-directing device 324.

Each downstream processing sub-system 348 and 349 includes a downstream control device 332 and 334, respectively. Each downstream control device 332 and 334, in turn, is communicatively coupled via a network 338 to upstream processor 340. As shown in the embodiment of FIG. 3, upstream processing sub-system 336, via upstream processor 340, is communicatively coupled to downstream control device 332, which is hereinafter referred to as "proximate control device 332," as it is associated with proximate fluid facility 320 of FIG. 3. Further, upstream processing sub-system 336, via upstream processor 340, is communicatively coupled to downstream control device 334, which is hereinafter referred to as "distant control device 334," as it is associated with distant fluid facility 332 of FIG. 3.

Each of proximate control device 332 and distant control device 334 are associated with sensors that measure and provide flow condition attribute values for proximate fluid facility 320 and distant fluid facility 322, respectively, and/or flow condition attribute values of input feed stream entering one or more of these fluid facilities. As will be described in connection with FIGS. 4 and 5, that these sensors are part of downstream processing sub-systems 348 and 349 of FIG. 3. Regardless of what these sensors are a part of, the flow condition attribute values measured by them are conveyed to proximate control device 332 and/or distant control device 334. Based on the flow condition attribute values received, proximate control device 332 and/or distant control device 334 compute load values for each proximate fluid facility 320 and distant fluid facility 322. Using the network connection 338, load values for each proximate fluid facility 320 and distant fluid facility 322 are conveyed from control device 332 and/or distant control device 334 to upstream processor 340.

In one preferred embodiment of the present arrangements, each downstream processing sub-system (e.g., downstream processing sub-systems 348 and 349) operates independent of each other, and there is no downstream processing sub-system that controls the operation of another downstream processing sub-system.

In a more preferred embodiment of the present arrangements, each downstream processing sub-system not only operates independent of another downstream processing sub-system, rather also operates independent of an upstream processor (e.g., upstream processor 340) and independent of a centralized control system, which is configured to control a plurality of downstream processing sub-systems. As a result, each downstream processing sub-system independently controls its functions in the absence of a master-slave relationship with another control system. In the arrangement shown in FIG. 3, a combination of proximate control device 332 and distant control device 334 represent a "distributed control scheme or network" within sewer system management because the control functions inside portion of sewer system 330 are distributed between proximate control device 332 and distant control device 334.

A "distributed control scheme or network" creates a decentralized system that allows fluid stream management system 300 to continue operating even if one of downstream processing sub-systems 348 or 349 and/or their associated fluid facilities are malfunctioning, or one of downstream processing sub-systems 348 or 349 are disconnected from upstream processor 340 so as to not be able to convey flow condition attribute values. By way of example, if a downstream control device (e.g., proximate control device 332 and distant control device 334) is not communicating an upstream processor (e.g., upstream processor 340), fluid stream management system 300 is configured to reroute an input fluid stream to other trunk lines, other one or more flow-directing devices and/or fluid facilities, instead of directing the input fluid stream to a fluid facility (e.g., proximate fluid facility 320 and distant fluid facility 322) whose associated downstream control device is not communicating with the upstream processor. Rerouting of one or more input fluid stream to other trunk lines, other one or more flow-directing devices and/or fluid facilities is carried out using the present teachings. Moreover, in this configuration a flow-directing device that is associated with the malfunctioning downstream processing sub-system and/or associated fluid facilities, is deemed to be a fluid facility for the sake of computation of modified total load value, which is detailed below in connection with FIGS. 4, 5, 8A and 8B. Such present teachings, of deeming a flow-directing device as a fluid facility, may also apply in situations where a fluid facility is operating at its full utilization capacity, and is not in position to accept any more input fluid streams for processing.

Figure 4:
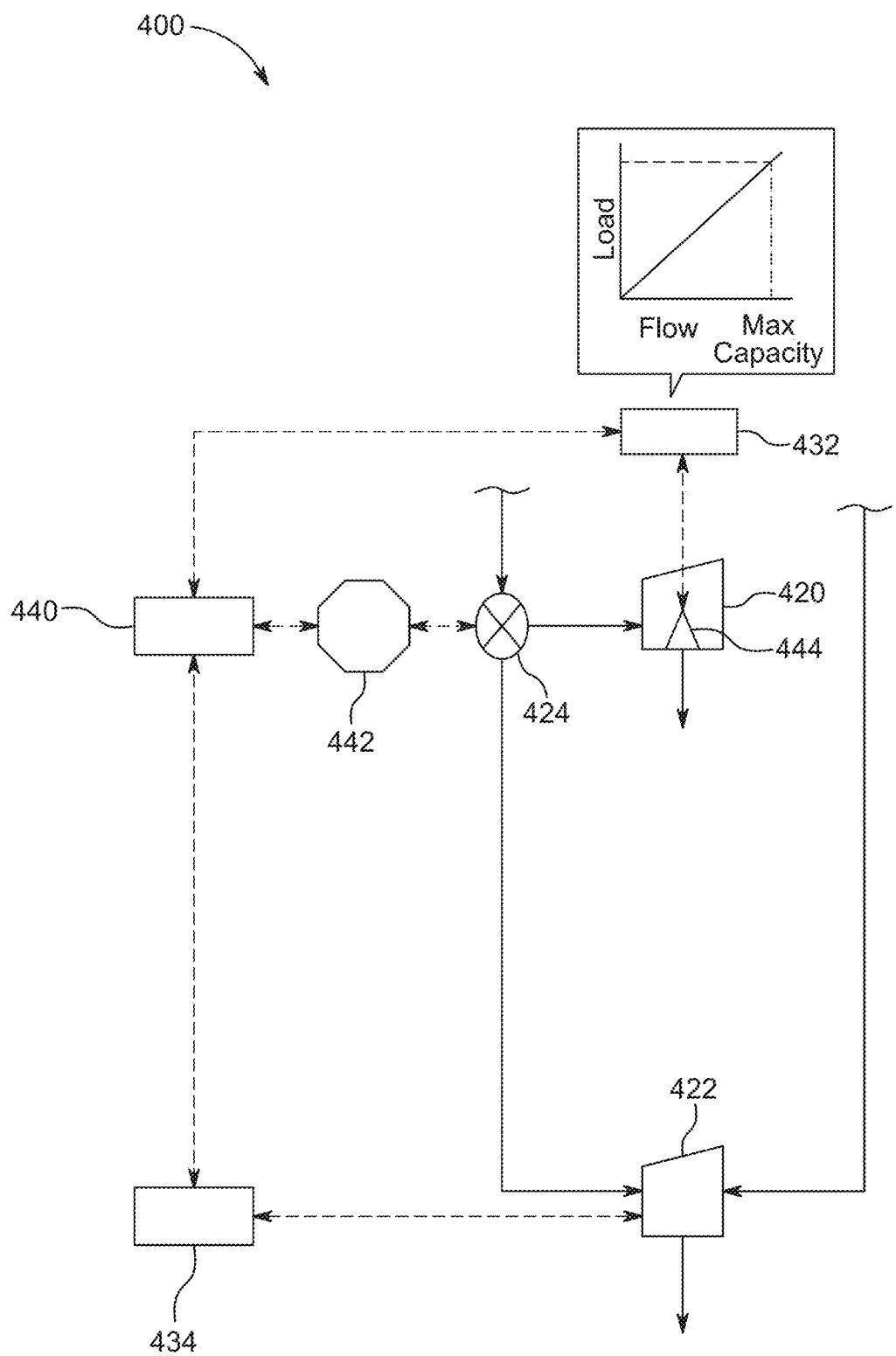
FIG. 4 shows another block diagram of the fluid stream management system of FIG. 3, according to another embodiment of the present arrangements and that determines a total load value of the proximate fluid facility, and wherein the total load value conveys a measure of the proximate fluid facility's utilization capacity, e.g., to any one of transport, store or treat a fluid stream.

FIG. 4 shows a block diagram of a fluid stream management system 400, according to one embodiment of the present arrangements. The block diagram of FIG. 4 illustrates an exemplar fluid flow scheme, for which interactions between an upstream processor 440 and a downstream control device 432 are described. These interactions between upstream processor 440 and downstream control device 432 involve flow condition attributes measured by sensors associated with proximate and distant fluid facilities 420 and 422 that are part of the flow scheme in FIG. 4. Certain components of fluid stream management system 400, i.e., proximate fluid facility 420, proximate control device 432, upstream processor 440, and fluid flow controller 442, are substantially similar to their counterparts shown in FIG. 3, i.e., proximate fluid facility 320, proximate control device 332, upstream processor 340, and fluid flow controller 342.

One or more fluid facility sensors (hereafter referred to as a "proximate fluid facility sensors") 444 are disposed inside proximate fluid facility 420 to measure flow condition attribute values of proximate fluid facility 420.

FIG. 4 shows only one proximate fluid facility sensor 444, however, the present arrangements are not so limited. Proximate fluid facility 420 may have any number of proximate fluid facility sensors 444 that are necessary to obtain the requisite fluid facility data for the controllers to make an informed decision about how to control flow-directing devices. During an operative state of fluid stream management system 400, one or more proximate fluid facility sensors 444 are used to determine one or more flow condition attribute values. Each fluid flow condition attribute value provides information relating to processing, e.g., transportation, storage, and/or treatment of one or more fluid streams undergoing processing inside proximate fluid facility 420. One or more proximate fluid facility sensors 444 measure a fluid stream's one or more flow condition attribute values. By way of another example, proximate fluid facility 420 may include a treatment portion and a storage portion. In this example, each portion may be equipped with one or more proximate fluid facility sensors for determining flow rate or available volume of storage capacity, respectively.

During an operative state, according to one embodiment of the present arrangements, proximate control device 432 receives one or more flow condition attribute values from proximate fluid facility sensor 444 and uses such value(s) to compute a load value for proximate fluid facility 420. In one embodiment of the present arrangements, the load value is linearly proportional to one or more flow condition attribute values. In another embodiment of the present arrangements, the load value is exponentially proportional to one or more flow condition attribute values. By way of example, as one or more flow condition attribute values approaches a predefined maximum flow condition attribute value for a fluid facility, the load value may increase. Regardless of the type of correlation between flow condition attribute values and load values, the correlation may be set forth in a lookup table that is stored inside proximate control device. The present teachings recognize that any downstream control device, whether proximate or distant, converts a flow condition attribute value to a load value.

Upstream processor 440, during one operative state of the present fluid stream management system 400 receives the load values, via a connection (wireless, e.g., network 338 shown in FIG. 3, or wired) from proximate control device 432 and a load value from distant control device 434. The load value obtained from the proximate control device 432 is for proximate fluid facility 420 and the load value obtained from distant control device 434 is for distant fluid facility 422.

Upstream processor 440, based upon the load values obtained for each of proximate fluid facility and distant fluid facility, computes a total load value for each of proximate fluid facility 420 and distant fluid facility 422, respectively. In one embodiment of the present teachings, total load value of a fluid facility is a product of the load value obtained for that facility (for example, from proximate control device 432 or distant control device 434) and a sum of one or more of the flow condition attribute values associated that fluid facility. Thus, upstream processor 440 computes and may have stored thereon, or on another associated memory, total load values for fluid facilities, which are part of a sewer system. Preferably, however, upstream processor 440 computes and stores total load values for those fluid facilities, which are designed to receive input fluid streams from flow-control device.

By way of example, in FIG. 4, computations performed at upstream processor 440 have a bearing on the operation of flow-directing device 424, and therefore, upstream processor 440 is "associated" with flow-directing device 424. In other words, upstream processor 440 computes load values for proximate fluid facility 420 and distant fluid facility 422, and its associated flow-directing device 424 of FIG. 4 directs input fluid streams between those fluid facilities, i.e., proximate fluid facility 420 and/or distant fluid facility 422.

The present teachings recognize that an upstream processor 440 may not compute all the total load values that its associated flow-directing device 424 requires, but may obtain such total load values from another upstream processor integrated into the present sewage management system.

According to FIG. 4, regardless of where the total load values are computed, a flow controller 442 uses such values obtained from upstream processor 440 to control the operation of flow-directing device 424. Specifically, fluid flow controller 442 of FIG. 4 receives, from upstream processor 440, two or more total load values, i.e., at least one for proximate fluid facility 420 and another for distant fluid facility 422, and then instructs flow-directing device 424 on how the input feed streams should be directed between the two fluid facilities.

According to one embodiment of the present teachings, fluid flow controller 442 controls or instructs flow-directing device 424 to minimize a sum of the total load values of proximate fluid facility 420 and distant fluid facility 422. Although they are shown as discrete components, in one embodiment of the present arrangements, fluid flow controller 442 is integrated into upstream processing sub-system 435.

Figure 5:
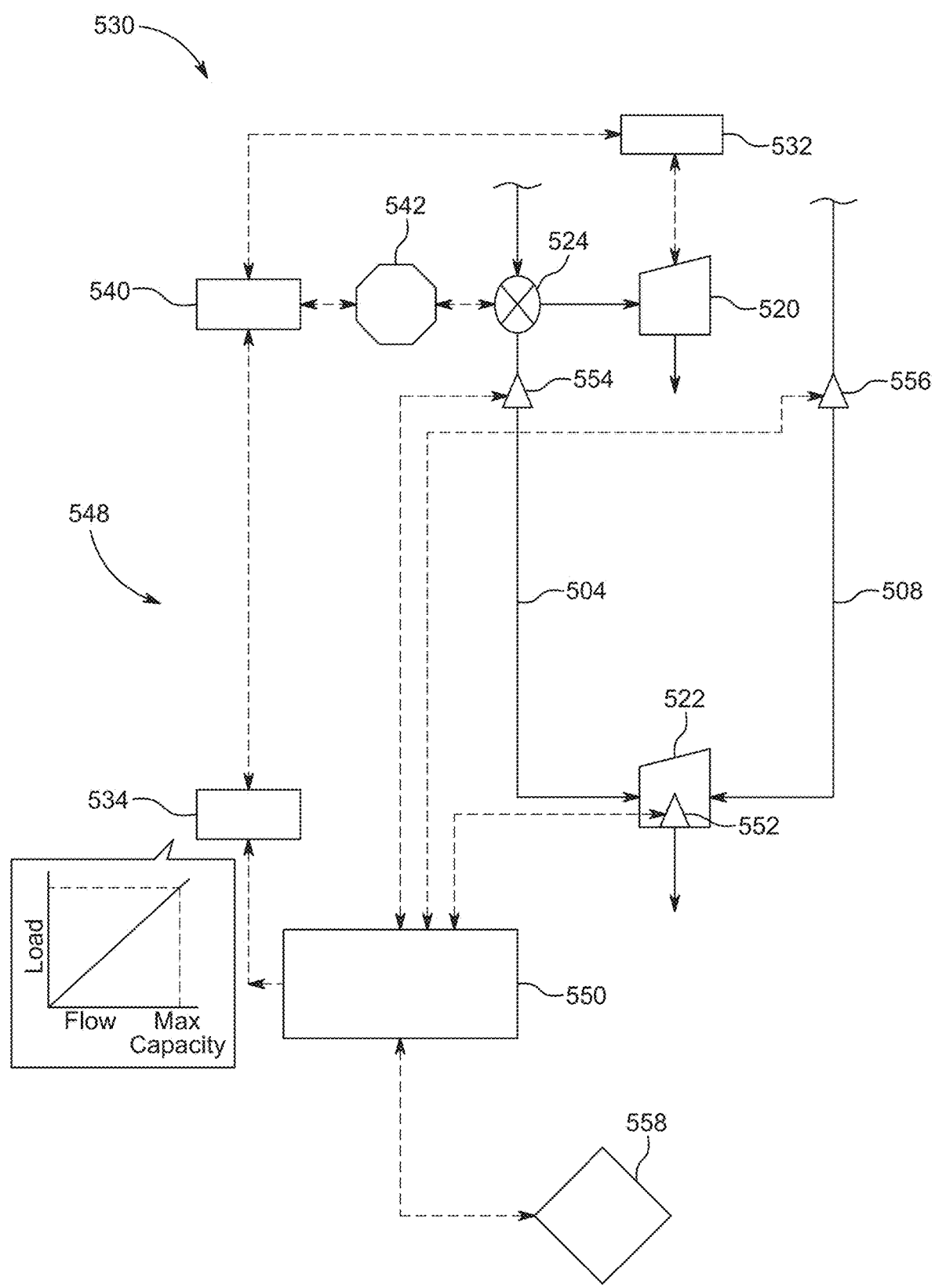
FIG. 5 shows yet another block diagram of the fluid stream management system of FIG. 3, according to yet another embodiment of the present arrangements and that is used for determining a modified total load value of the distant fluid facility, and wherein the modified total load value conveys a measure of the distant fluid facility's utilization capacity upon arrival of a fluid stream for treatment at a future instance in time at the distant fluid facility.

FIG. 5 shows a block diagram of a fluid stream management system 500, according to one embodiment of the present arrangements and that includes a neural network 550. As explained above, the current state of the art does not recognize the need to account for conditions (e.g., conditions caused by arrival of different input fluid streams) at or loads placed upon a fluid facility in the future when a particular input fluid stream may arrive there for processing. The present teachings not only recognize a need for such accountability, but also propose using a neural network that accounts for future conditions at or loads placed upon a fluid facility. The present arrangements, preferably, use neural network 550 to accounts for future conditions at or loads placed upon a distant fluid facility 522 where one or more input fluid streams arrive later in time, relative to an arrival time of one or more input fluid streams at an proximate fluid facility 520. In other words, neural network 550 provides a measure of fluid flow condition attributes (e.g., processing flow rate inside the fluid facility) at a fluid facility, such as distant fluid facility 522, upon arrival of a particular input fluid stream that is to undergo processing.

Certain components of fluid stream management system 500, i.e., downstream processing sub-system 548, proximate control device 532, distant control device 534, upstream processor 540, fluid flow controller 542, and downstream processing sub-system 548, which are substantially similar to their counterparts found in fluid stream management system 300 of FIG. 3, i.e., downstream processing sub-system 348, proximate fluid facility 320, proximate control device 332, upstream processor 340, fluid flow controller 342, and downstream processing sub-system 348. Fluid stream management system 500, however, includes neural network 550, which is not shown in FIG. 3.

Neural network 550 is communicatively coupled to one or more sensors, such as distant fluid facility sensors 552, pre-processing flow sensors 554 and 556. Distant fluid facility sensors 552 measure and provide to neural network 550 flow condition attribute values for distant fluid facility 522. Each of pre-processing flow sensors 554 (associated with trunk line 504) and 556 (associated with trunk line 508) measures and provides to neural network 550 flow condition attribute values of different input feed stream entering distant fluid facility 522. Using these one or more different types of flow condition attribute values, neural network 550 calculates one or more modified flow condition attribute values, which are transmitted to distant control device 534. In one embodiment of the present arrangements, pre-processing flow sensors 554 and 556 are located equidistant from distant fluid facility 522. Although such condition of equidistant placement of these sensors from distant fluid facility 522 is not necessary, equidistant placement of sensors allows neural network 550 to more easily account for different future conditions, when different input fluid streams (conveyed using trunk lines 504 and 508) arrive, at distant fluid facility 522.

In the present arrangements, each modified fluid condition attribute value is a predicted fluid condition attribute value at a future instance in time, t=x, where "x" is a future time value when a particular input fluid stream arrives at distant fluid facility 522 for processing. In other words, modified condition attribute values account for changes affecting distant fluid facility 522 in a time period between when flow-directing device 534 directs an input fluid stream towards distant fluid facility 522 and when that input fluid stream arrives at distant fluid facility 522 for processing.

In another embodiment of the present arrangements, neural network 550 also receives weather forecast information from a weather forecast information provider 558 (e.g., National Oceanic and Atmospheric Administration). Weather forecast information provided to neural network 550 includes at least one weather related information value selected from a group comprising precipitation, temperature, humidity, and atmospheric pressure. Preferably, the weather related information received at neural network 550 includes statistical information such as mean, standard deviation, and probability distribution function for the weather related information of precipitation, temperature, humidity, and atmospheric pressure. Weather related information, by way of example, allows neural network 650 to anticipate increased fluid flow into a fluid facility, such as distant fluid facility 552, due to rainfall runoff According to the present teachings, this would reduce the available utility capacity of distant fluid facility 522.

Distant control device 534 receives one or more of the modified flow condition attribute values and uses such value(s) to compute one or more modified load values for distant fluid facility 552. A modified load value, conveys a measure of available utilization capacity of distant fluid facility 522 at a future instance in time, t=x, where "x" has units of minutes or hours.

Upstream processor 540 receives one or more modified load values from distant control device 534 and one or more load values from proximate control device 532. Based on these modified load value(s) and load value(s), upstream processor 540 computes one or more modified total load values for distant fluid facility 522 and one or more total load values for proximate fluid facility 520. In one embodiment of the present teachings, a modified total load value is the product of the modified load value obtained for distant fluid facility 522 and a sum of one or more modified flow condition attribute values associated with distant fluid facility 522. Computation of total load values is explained above in connection with FIG. 4.

Fluid flow controller 542 receives total load value(s) and modified total load value(s) from upstream processor 540. Based on total load value(s) and modified total load value(s), fluid flow controller 542 adjusts fluid flow through flow-directing device 524 to proximate fluid facility 520 and/or distant fluid facility 522. In one embodiment of the present teachings, fluid flow controller 542 adjusts fluid flow through flow-directing device 524 to minimize both the modified total load value(s) and/or total load value(s) for one or both fluid facilities 520 and 522. In one preferred embodiment of the present arrangements, fluid flow controller 542 adjusts fluid flow through flow-directing device 542 to minimize a sum of total load value(s) (associated with proximate fluid facility 520) and modified total load value(s) (associated with distant fluid facility 522).

Example 1, discussed below, explains how fluid flow controller 542, using total load value(s) and modified total load value(s), instructs flow-directing device 524 to adjust fluid flow to proximate fluid facility 520 and/or distant fluid facility 522.

In another preferred embodiment of the present arrangements, fluid flow controller 542 adjusts fluid flow through flow-directing device 542 using a proportional integral derivative algorithm to minimize total load value(s) and modified total load value(s) of fluid facilities 520 and 522, respectively. Example 2, discussed below, explains how fluid flow controller 542, using the proportional integral derivative algorithm, instructs flow-directing device 524 to adjust fluid flow to proximate fluid facility 520 and/or distant fluid facility 522.

Neural network 550, in one embodiment of the present arrangements, is distinct from and not integrated with distant control device 534 of a downstream processing sub-system (e.g., down stream processing sub-system 334 of FIG. 3). In another embodiment of the present arrangements, however, neural network 550 is collocated with distant control device 534. Regardless of location or integration of neural network 550 with respect to distant control device 534, neural network 550 performs the function described above.

Figure 6:
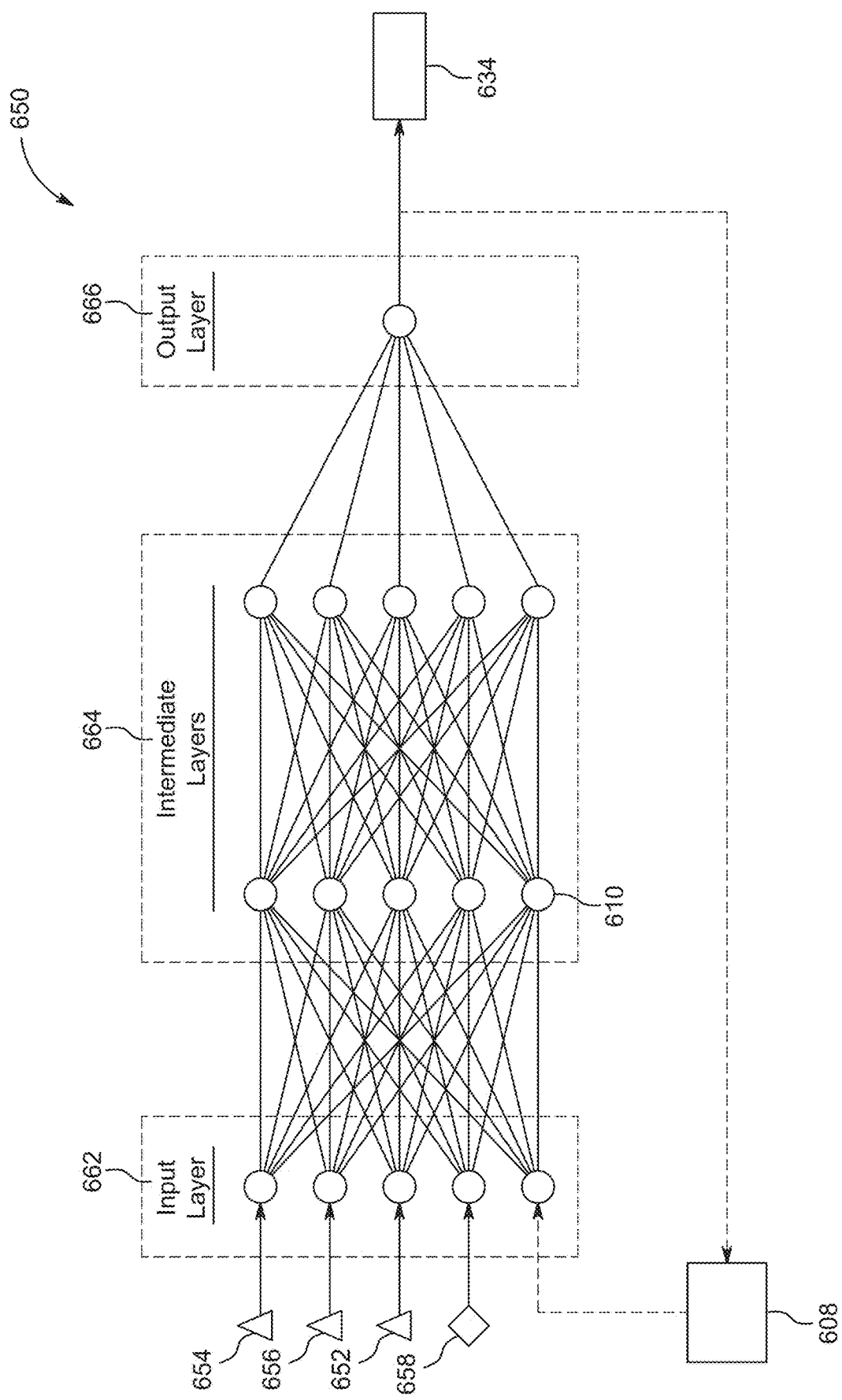
FIG. 6 shows a block diagram of a neural network, according to one embodiment of the present arrangements and that includes an input layer, one or more intermediate layers, and an output layer for arriving at a load value, which conveys the utilization capacity of a fluid facility per unit volume of the fluid stream at a future instance in time.

FIG. 6 shows a block diagram of a neural network 650, according to one embodiment of the present teachings and that includes an input layer 662, one or more intermediate layers 664, and an output layer 666. Neural network 650 is communicatively coupled, at input layer 662, to one or more sensors (e.g., pre-processing flow sensors 654 and 656, fluid facility sensor 652) and at output layer 634, to a distant control device 634. Neural network 650, pre-processing flow sensors 654 and 656, fluid facility sensor 652, and distant control device 634 are substantially similar to their counterparts neural network 550, pre-processing flow sensors 554 and 556, fluid facility sensor 552, and distant control device 534 of FIG. 5.

As shown in FIG. 6, input layer 662 receives one or more flow condition attribute values from pre-processing flow sensors 654 and 656. As explained above, each pre-processing flow sensor 654 and 656 measure flow condition attribute values of one or more input fluid streams (e.g., input fluid streams within trunk lines 504 and 508 of FIG. 5, respectively) received at a fluid facility (e.g., distant fluid facility 522 of FIG. 5). Input layer also receives one or more flow condition attribute values from fluid facility sensor 652, which provides flow condition attribute values for distant fluid facility (e.g., distant fluid facility 522 of FIG. 5). In addition to information from pre-processing flow sensors 654 and 656 and fluid facility sensor 652, input layer 662 also receives, in one embodiment of the present arrangements, information from a weather forecast input provider 658, which is substantially similar to weather forecast input provider 558 of FIG. 5.

One or more intermediate layers 664 constrain one or more of the flow condition attribute values (received at input layer 662) and additional information (e.g., weather forecast input). In one embodiment of the present teachings, one or more intermediate layers 664 generate modified flow condition attribute values. In one preferred implementation of the present teachings, intermediate layers 664 constrain, using predetermined weights and biases at each node 610 in each intermediate layer 664, to arrive at properly weighted and/or biased flow condition attribute values. Output layer 666 of neural network 650 computes, based on properly weighted and/or biased flow condition attribute values, one or more modified flow condition attribute values. These modified flow condition attribute values may then be transmitted from output layer 666 to distant control device 634. For ease of illustration, FIG. 6 illustrates a single modified flow condition attribute value, however, the present arrangements are not so limited. Any number of modified flow condition attribute values may be generated by neural network 650 for conveyance from output layer 666 to distant control device 634.

In another embodiment of the present arrangements, output layer 666 is communicatively coupled, through a connection, to input layer 662. In this configuration, input layer 662 receives modified flow condition attribute values from output layer 666. Thus, neural network 660 may use previously computed or historical modified flow condition attribute values to compute one or more new modified flow condition attribute values. Previously computed modified flow condition attribute values allow neural network 660 to account for changes in values of fluid condition attributes, which, are associated with a distant fluid facility, as a function of time. By way of example, when environmental factors, such as soil saturation and ground water storage, are accounted for in previously computed modified flow condition attribute values, neural network 660 uses these previously computed values in conjunction with newly obtained flow condition attribute values to generate modified flow condition attribute values.

In a preferred embodiment of the present fluid stream management systems, a fluid management memory 608 is communicatively coupled to input layer 662 and output layer 666. One or more modified flow condition attribute values, obtained from output layer 666, are stored in fluid management memory 608. During subsequent operative states of the fluid stream management system, according to one embodiment of the present arrangements, one or more modified flow condition attribute values, saved in fluid management memory 608, are retrieved and provided to input layer 662. Input layer 662 is free to use such historical information in many numbers of ways. For example, such historical information may use predetermined weights and biases and may be combined with current flow condition attribute values to arrive at modified flow condition attribute values.

In certain embodiments of the present arrangements, fluid management memory 608 is communicatively coupled to input layer 662 and one or more pre-processing flow sensors (e.g., pre-processing flow sensors 654 and 656) and/or one or more fluid facility sensors (e.g., fluid facility sensor 652). One or more flow condition attribute values obtained from one or more pre-processing flow sensors and/or one or more fluid facility sensors are stored in fluid management memory 608. During an operative state of the fluid stream management system according to one embodiment of the present arrangements, fluid management memory 608 provides the historical flow condition attribute values to input layer 662. Historical flow condition attribute values also allow neural network 660 to account for previous factors that caused flow condition attribute values, associated with a distant fluid facility, to change as a function of time.

Figure 7:
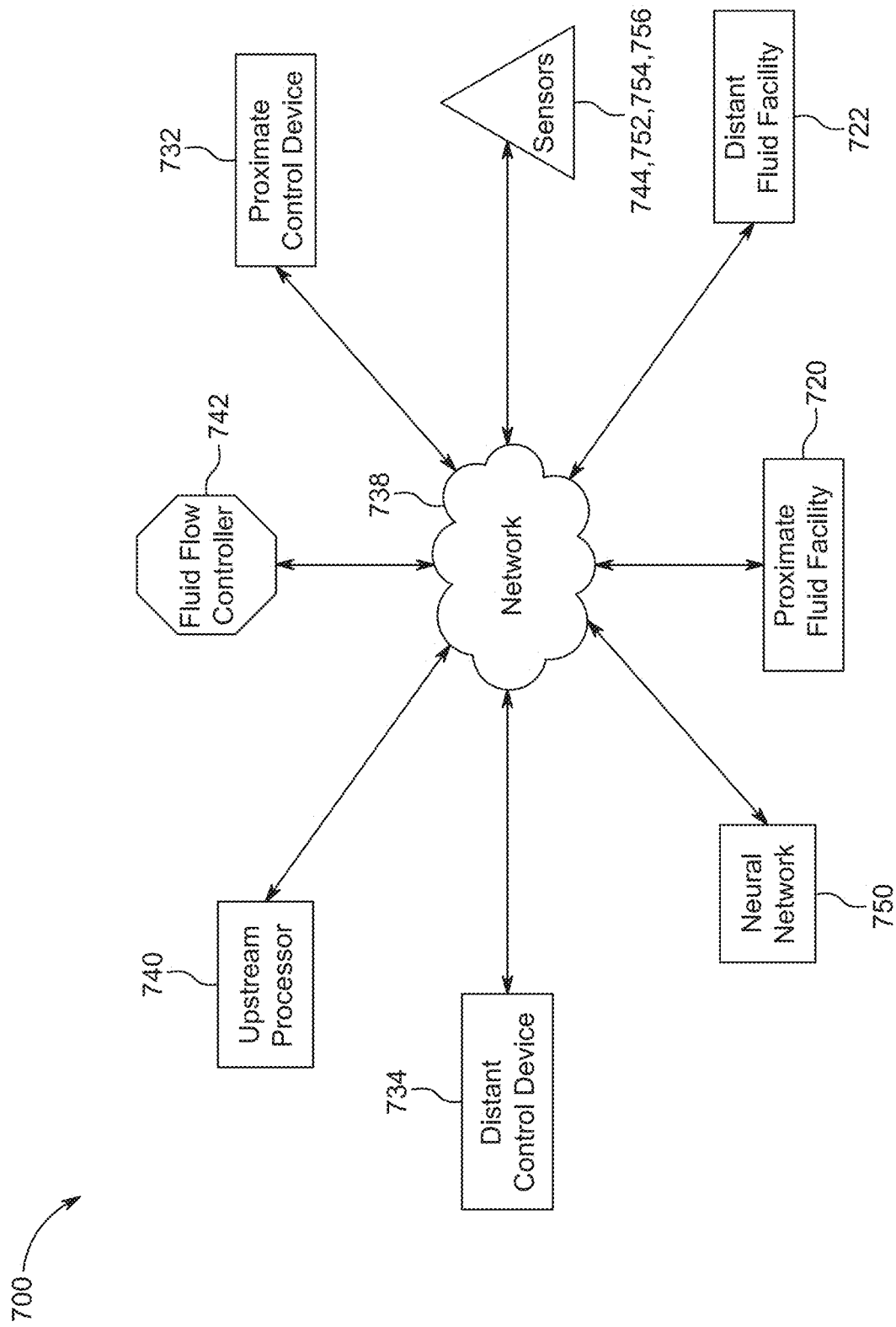
FIG. 7 shows a fluid stream management system, according to one embodiment of the present arrangements, in which each component of the present fluid stream management system is communicatively coupled to the other via a wireless network.

FIG. 7 shows a fluid stream management system 700, according to one embodiment of the present arrangements and that includes a wireless network 738, which facilitates communication between various components of fluid stream management system 700. As shown in FIG. 7, each of proximate fluid facility 720, distant fluid facility 722, proximate control device 732, distant control device 734, upstream processor 740, fluid flow controller 742, neural network 750, and sensors (e.g., pre-processing sensors and fluid facility sensors) 744, 752, 754 and 756 may each communicate, via wireless network 738, with others. By way of example, wireless network 738 communicatively couples proximate control device 732 and distant control device 734 and/or to one or more upstream processors 740. Proximate fluid facility 720, distant fluid facility 722, proximate control device 732, distant control device 734, upstream processor, fluid flow controller 742, neural network 750, and sensors (e.g., pre-processing sensors and fluid facility sensors) 744, 752, 754 and 756 of FIG. 7 are substantially similar to their counterparts in FIGS. 1-5 (e.g., proximate fluid facility 120, 320, 420, and 520 shown in FIGS. 1-5, distant fluid facility 122, 322, 422, and 522 shown in FIGS. 1-5, proximate control device 332, 432, and 532 shown in FIGS. 3-5, distant control device 334, 434, 534 shown in FIGS. 3-5, upstream processor 340, 440, and 540 shown in FIGS. 3-5, fluid flow controller 342, 442, 542 shown in FIGS. 3-5, neural network 550 and 650 shown in FIGS. 5 and 6, and sensors (e.g., pre-processing sensors 554, 556, 654, 656 and fluid facility sensors 444 and 552) shown in FIGS. 4 and 5).

In the configuration shown in FIG. 7, wireless network 738 facilitates transfer to a one or more load values and/or one or more modified load values to upstream processor 740. The combination of one or more of these components, among others, allows a sewer system (e.g., sewer system 100) to effectively process different input fluid streams arriving at different times at different fluid facilities with different processing capacities.

At least one flow-directing device 734 (e.g., flow directing device 124 of FIG. 1) may be selected from a group comprising fluid pump station, gate, inflatable dam, weir, valve, and fluid facility. A fluid facility may be any sewer system component that acts on the fluid in the sewer system. At least one of the fluid facilities (e.g., proximate fluid facility 720 and distant fluid facility 722) may be selected from a group comprising storage tank, trunk line, fluid treatment plant, holding pool, reservoir, ocean, and river. In one embodiment of the present teachings, one or more fluid facility sensors 744, 752, 754 and 756 include at least one sensor selected from a group comprising level sensor, flow meter, thermometer, dissolved oxygen sensor, pH level sensor, conductivity sensor, oxidation reduction potential sensor, *E. Coli* count sensor, total organic carbon level sensor, nitrate level sensor, phosphorus level sensor and bacteria count sensor.

A control device (e.g., proximate control device 732 and distant control device 734), in one embodiment of the present arrangements, is a computer or processing device capable of performing specialized instruction and, among other things, calculating a load value for a fluid facility associated with that control device.

An upstream processor 740 may be a computer or processor capable of performing specialized instructions, which includes, among other instructions, determining total load values for two or more fluid facilities.

The present teachings recognize that not all of these components are necessary for the effective operation of the present fluid stream management systems. Specifically, in certain embodiments of the present arrangement, an upstream processor (e.g., upstream processors 340, 440, 540 and 740 of FIGS. 3, 4, 5 and 7, respectively) are not required, and therefore not part of these fluid stream management systems.

To this end, certain present fluid stream management systems include: (i) one or more downstream processing sub-systems, each of which is associated with one or more fluid facilities; (ii) one or more neural networks; (iii) one or more fluid flow controllers. Also, absent from these embodiments of the present arrangements, is a flow-directing device, which is part of or integrated into a fluid collection and conveyance system that is managed by one or more of these present fluid stream management systems.

Each of one or more of the downstream processing sub-systems may include: (i) one or more fluid facility sensors; (ii) one or more pre-processing flow sensors; and (iii) one or more downstream control devices.

The fluid facility sensors are configured for facilitating determination of one or more flow condition attribute values of one or more of the associated fluid facilities. One of the flow condition attribute values may provide information regarding processing of one or more of input fluid streams inside one or more of the associated fluid facilities.

The pre-processing flow sensors are configured to facilitate determination of one or more of the flow condition attribute values of one or more of the input fluid streams prior to their entering one or more of the associated fluid facilities.

One or more of the downstream processors, in these embodiments, are configured to compute, based on one or more of the flow condition attribute values obtained using one or more of the fluid facility sensors and/or one or more of the pre-processing flow sensors, a load value for each of one or more of the associated fluid facilities.

In these embodiments, neural network includes an input layer, one or more intermediate layer and an output layer. The input layer is communicatively coupled to one or more of the fluid facility sensors and/or one or more of the pre-processing flow sensors, such that one or more of the flow condition attribute values of one or more of the associated fluid facilities and/or one or more of the flow condition attribute values of one or more of the input fluid streams are received at the neural network.

The intermediate layer, based on one or more of the flow condition attribute values obtained using one or more of the fluid facility sensors and/or one or more of the pre-processing flow sensors, is configured to compute one or more modified fluid condition attribute values of one or more of the distant fluid facilities. Such computation accounts for changes in values of one or more fluid condition attributes, as a function of time, of one or more of the distant fluid facilities and of one or more of the input fluid streams entering the distant fluid facilities.

The output layer is communicatively coupled to one of the downstream control devices, such that one or more of the modified fluid condition attribute values of one or more of the distant fluid facilities is conveyed to the downstream control device. This downstream control device computes, based on one or more of the modified fluid condition attribute values, a modified load value for each of one or more of the distant fluid facilities.

The fluid controller is coupled to one or more of the downstream processing sub-systems and is designed to be coupled to at least one or more of flow-directing devices (which is not part of the management system and may be integrated into a fluid collection and conveyance system). During an operative state of one or more of the fluid flow controllers, at least one of them adjusts fluid flow through one or more of flow-directing devices to minimize a sum of at least one of the load values of the proximate fluid facility and at least one of the modified load values of the distant fluid facility.

The present teachings offer, among other things, methods of managing a fluid stream. FIG. 8 shows a method of managing a fluid stream 800, according to one embodiment of the present teachings. Method 800 may begin with a step 802, which includes receiving, using one or more proximate fluid facility sensors (e.g., proximate fluid facility sensor 444 of FIG. 4), one or more proximate flow condition attribute values for a proximate fluid facility (e.g., proximate fluid facility 420 of FIG. 4). As discussed above, the proximate fluid facility is proximate to a flow-directing device (e.g., flow-directing device 424 of FIG. 4) relative to a distance between a distant fluid facility (e.g., distant fluid facility 422 of FIG. 4) and the flow-directing device.

Next, or contemporaneously with step 802, a step 804 is carried out. This step includes receiving, at one or more distant fluid facility sensors (e.g., distant fluid facility sensor 552 of FIG. 5), one or more distant flow condition attribute values for the distant fluid facility.

Method 800 may next, or contemporaneously with steps 802 or 804, implement step 806, which involves receiving, using one or more pre-processing sensors, one or more pre-processing flow condition attribute values for one or more input fluid streams entering the distant fluid facility.

Next, a step 808 includes calculating, using a downstream control device (e.g., proximate control device 432 of FIG. 4), a load value of the proximate fluid facility. The load value is calculated using one or more flow condition attribute values of the proximate fluid facility. By way of example, step 808 includes using a lookup table (e.g., graph associated with proximate control device 432), which correlates a flow condition attribute value to a load value and then for a particular flow condition attribute value measured by one or more of the flow sensors, a load value for a fluid facility is obtained from the lookup table. The correlation, which provides the values in the lookup table, is predetermined and arrived at by studying historical data of an operating fluid facility.

By way of example, a lookup table may assign a minimum load value (e.g., zero) to flow condition attribute values obtained at dry weather conditions. In contrast, the lookup table may assign maximum load value (e.g., one) to flow condition attribute values obtained at maximum wet weather conditions, when a fluid facility is operating at a maximum fluid facility utilization capacity (e.g., maximum treatment capacity, maximum conveyance or transportation capacity, or maximum storage capacity). The rate at which a load value increases, relative to flow condition attribute values, from the minimum load and to the maximum load may be presented as a linear relationship in the lookup table. As such, an increase in a flow condition attribute value has a proportional increase in a load value.

In one embodiment of the present teachings, however, the rate of increase from a minimum load value to a maximum load value, relative to flow condition attribute values, may change for a variety of different reasons. By way of example, under a first linear relationship between load values and flow condition attribute values, a load value corresponds to a first flow condition attribute value (e.g., load value=2x, where x is a value of fluid flow rate in units of MGD). Where a load value increases from 0, e.g., under dry weather operating conditions, to a second load value that corresponds to about 90% of the utilization capacity, the slope is equal to 2. This means that under the first linear relationship, the rate of increase of load value, relative to the flow condition attribute values, is about $2/MGD^2$, which is the slope of the first linear relationship.

As another example, under a second linear relationship, which is different from the first linear relationship described above, the load value increases from the second load value (which corresponds to about 90% of the utilization capacity) to a final load value that corresponds to about 100% of the utilization capacity (e.g., load value=15x−b, where "x" is a value of fluid flow rate in units of MGD, and "b" represents a y-intercept value, which is −1170), relative to the flow condition attribute value, is about $15/MGD^2$. This means that under the second linear relationship, the rate of increase of load value, relative to the flow condition attribute values, is $15/MGD^2$, which is the slope of the second linear relationship.

Thus, when a utilization capacity of a fluid facility increases above a threshold value of utilization capacity, e.g., about 90% of the maximum utilization capacity value, then the rate of increase of the load values increases drastically, e.g., from about $2/MGD^2$ to about $15/MGD^2$. In other words, a flow-directing device of the present arrangements would assign greater load values on a system that is operating at higher echelons of utilization capacity, e.g., between about 90% an about 100% of the maximum utilization capacity of the fluid facility. Further, the flow-directing device would redirect input fluid streams away from fluid facilities operating at such high echelons of utilization capacity. Conversely, the fluid-directing device of the present arrangement may direct input fluid streams towards facilities operating below a threshold value of utilization capacity.

Method 800 may then proceed to step 810, which includes arriving at one or more modified flow condition attribute values for the distant fluid facility. In a preferred embodiment of the present teachings, a neural network is used to arrive at one or more of the modified flow condition attribute values. Further, modified flow condition attribute values are based upon one or more distant flow conditional attribute values and/or one or more pre-processing flow condition attribute values obtained from previous steps 804 and 806. In another preferred embodiment of the present teachings, the neural network also uses weather forecast information to arrive at one or more of the modified flow condition attribute values. In yet another preferred embodiment of the present teachings, the neural network uses historical flow condition attribute values obtained from one or more fluid facility sensors and/or one or more pre-processing flow sensors.

In certain embodiments of the present teachings, historical modified flow condition attribute values are saved to a memory. During subsequent calculations of modified flow condition attribute values, these historical values are retrieved from memory and used, in conjunction with measurements from fluid facility sensors and/or one or more pre-processing flow sensors, to arrive at new modified flow condition attribute values.

A step 812 includes calculating, using a downstream control device (e.g., distant control device 434 of FIG. 4), a modified load value of the distant fluid facility. As discussed above in connection with step 808, a lookup table is used and in connection with step 812, the lookup table correlates a modified flow condition attribute value to a modified load value.

A step 814 may be carried out at any step after a load value is determined. Step 814 includes determining, using an upstream processor (e.g., upstream processor 340 of FIG. 3), a total load value for the proximate fluid facility. The total load value is a product of the load value of the proximate fluid facility and the sum of one or more fluid condition attribute values of one or more fluid streams flowing in the proximate fluid facility. By way of example, if the proximate fluid facility has a load value of 10.5 per million gallons per day ("MGD") and the proximate fluid facility has, defined therein, two fluid flow rate values of 5 MGD and 7 MGD for a first fluid stream undergoing processing and a second fluid stream undergoing processing, respectively, then the total load value, a dimensionless value, is 126 (i.e., 10.5/MGD×(5 MGD+7 MGD)=126)).

Next, a step 816 is carried out. Step 816 includes determining, using an upstream processor (e.g., upstream processor 440 of FIG. 4), a modified total load value for the distant fluid facility. The modified total load value is a product of the modified load value of the distant fluid facility and the sum of one or more modified fluid condition attribute values of one or more fluid streams flowing in the distant fluid facility. By way of example, if the distant fluid facility has a modified load value of 20/MGD and the distant fluid facility is processing two different fluid streams having a modified fluid flow rate of 2 MGD and 3 MGD, then the total load value is 100 (i.e., (20/MGD×(2 MGD+3 MGD)=100)).

Next, a step 818 includes adjusting, using a fluid flow controller (e.g., fluid flow controller 342 of FIG. 3) coupled to a flow-directing device (e.g., flow-directing device 324), fluid flow through the flow-directing device to minimized a sum of the total load value and the modified total load value. Examples presented below describe how a fluid flow controller (e.g., fluid flow controller 342 of FIG. 3) may instruct or adjust flow-directing device (e.g., flow-directing device 324) to direct certain input fluid stream towards or away from a particular fluid facility.

Figure 8A:
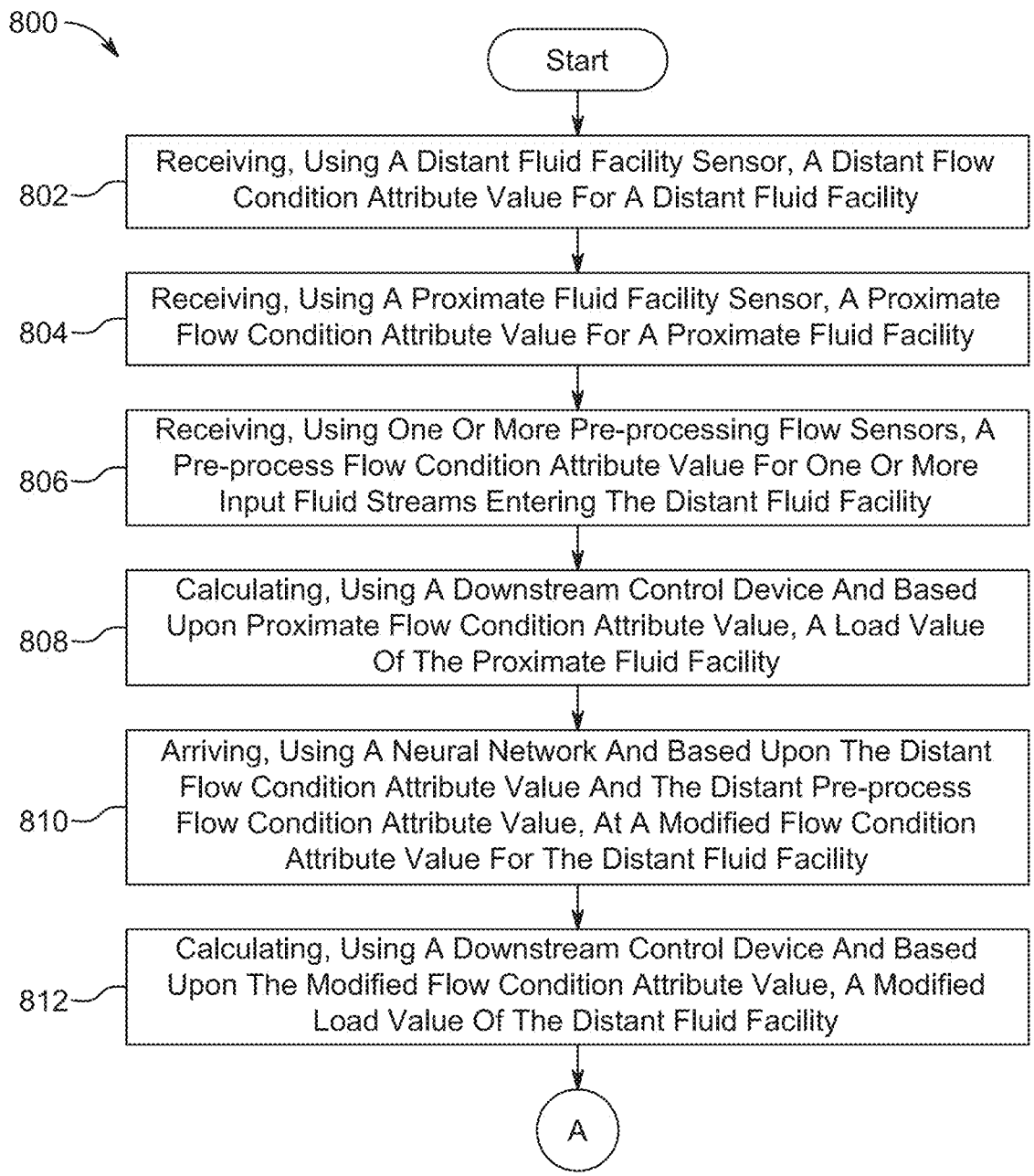
FIGS. 8A and 8B show a method, according to one embodiment of the present teachings, of controlling transport of a fluid stream within a sewer system.
Figure 8B:
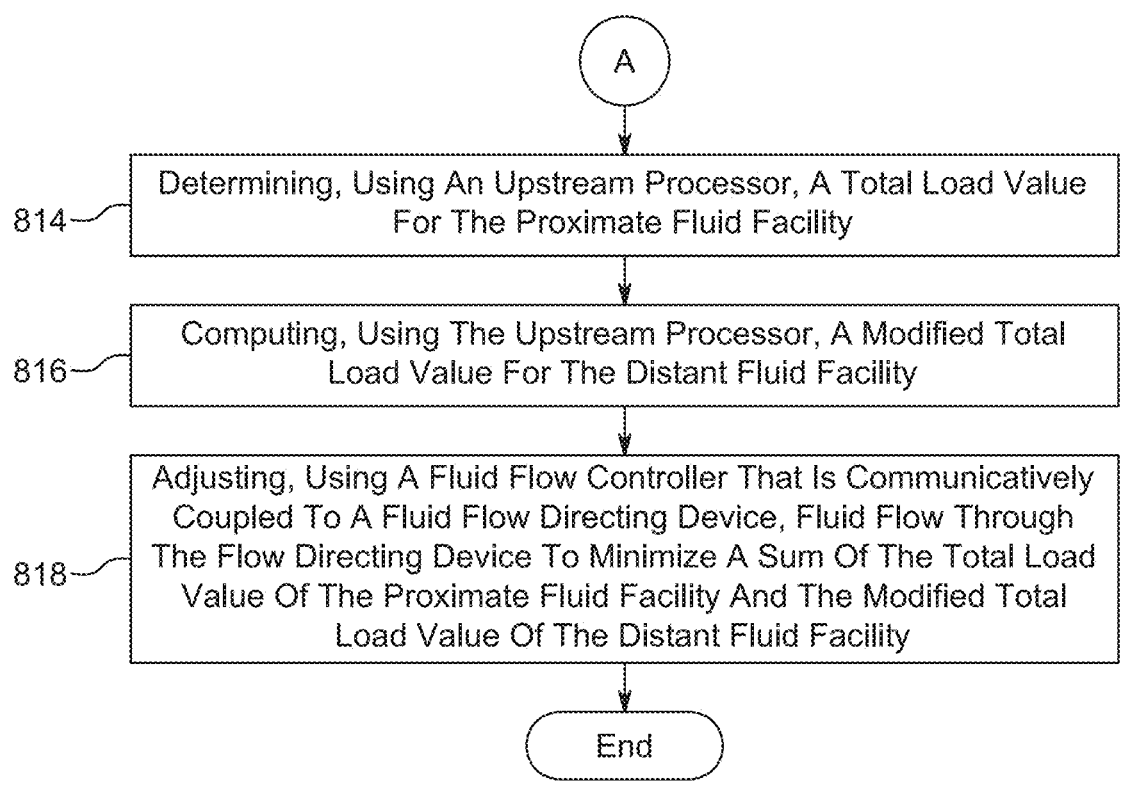

As explained below in connection with Example 2, the present teachings recognize that in those instances where a linear relationship exists between flow condition attribute values within a facility and load values of the facility, there is no need to compute total load values and modified total load values as required by steps 814 and 816 of FIGS. 8A and 8B. Moreover, with respect to fluid stream management systems described herein, an upstream processor (e.g., upstream processors 340, 440 or 540 of FIGS. 3, 4 and 5, respectively) are not required, and therefore not part of the fluid stream management systems.

Example 1

Example 1 is a simulated method used by a fluid stream management system 530 shown and described in FIG. 5. In this example, an input fluid stream received at a flow-directing device 524 had a fluid flow rate of 90 MGD. Further, a fluid stream undergoing processing inside proximate fluid facility 520 had a fluid flow rate of 50 MGD, and a fluid stream undergoing processing inside distant fluid facility 522 had a fluid flow rate of 30 MGD.

Continuing with this example, an input fluid stream released by flow-directing device 524 and received by distant fluid facility 522 had a fluid flow rate of 40 MGD, and another input fluid stream within trunk line 508 had a fluid flow rate of 20 MGD.

As a result, neural network 550 received fluid flow rate values of 30 MGD for the distant fluid facility, 40 MGD for trunk line 504, and 20 MGD for trunk line 508. Using these flow rates, neural network 550 computed a modified fluid flow rate of 78 MGD for distant fluid facility 552. The modified fluid flow rate value of 78 MGD was a predicted value for distant fluid facility 522 where processing of the input fluid stream heading towards distant fluid facility 522 would take place 2 hours after it was released from flow-directing device 524.

Proximate control device arrived at a load value of 0.5/MGD for proximate fluid facility 520. The load value was arrived at using a lookup table that relies upon a linear relationship between the fluid flow rate values within proximate fluid facility 520 and the load values for that facility. In this example, load value=fluid flow rate value/100. The denominator value of 100 is arbitrary and, in this instance, was based on the assumption that proximate fluid facility 520 has a maximum utility capacity of 100 $MGD^2$. Thus, about 50 MGD/100 $MGD^2$=load value of 0.5/MGD.

With respect to distant fluid facility 522, distant control device 534 received the modified flow rate from neural network 550 and calculated a modified load value of about 0.39/MGD for distant fluid facility 522 for an input fluid stream that may arrive there 2 hours after it was released from flow-directing device 524. In this example, a modified load value was computed as follows: modified load value=fluid flow rate/200 $MGD^2$. Thus, 78 MGD/200 $MGD^2$=load value of about 0.39/MGD. Again, the denominator value of 200 is arbitrary and, in this instance, was based on the assumption that distant fluid facility 522 has a maximum utility capacity of 200 $MGD^2$.

In connection with the computation of total load value, upstream processor 540 received the load value from proximate control device 532 and computed a total load value for proximate fluid facility 520. The total load value is the product of the load value and the flow rate within proximate fluid facility 520, i.e., about 0.5 MGD×50 MGD=about 25. Therefore, the total load value, a dimensionless number, for proximate fluid facility 520 is 25.

Upstream processor 540 also received the modified load value from distant control device 534 and computes a modified total load value for distant fluid facility 522. The modified total load value is the product of the modified load value and the flow rate within distant fluid facility 522, i.e., 0.39MGD×78 MGD=30.42. Thus, the modified total load value for distant fluid facility 522 was 30.42.

Fluid flow controller 542 received the total load value and the modified total load value. Using these values, fluid flow controller 542 instructed flow-directing device 524 to adjust flow towards proximate fluid facility 520 and/or distant fluid facility 522 to minimize the sum of the total load value and the modified total load value. As a result, the sum of the total load value and the modified total load value was 55.42, i.e., total load value of 25+modified total load value of 30.42=55.42. Assuming the flow rate in proximate fluid facility 520 and the modified fluid facility does not change, fluid flow controller 542 instructed flow-directing device 524 to redirect 1 MGD of the fluid stream that is flowing to proximate fluid facility 520 to the fluid stream that is flowing to distant fluid facility 522. The present teachings recognize that it is preferable for fluid flow controller 542 to instruct flow-directing device 524 to redirect small amounts of an input fluid stream from one fluid facility, e.g., proximate fluid facility 520, to another fluid facility, e.g., distant fluid facility 522, because it takes an appreciable amount of time for flow-directing device 524 to implement the redirecting instruction and for the fluid stream management system of the present arrangements to recognize the implementation of the redirecting instructions. Thus, the fluid flow rate within proximate fluid facility 520 is adjusted from 50 MGD to 49 MGD and the modified fluid flow rate within distant fluid facility 522 is adjusted from 78 MGD to 79 MGD.

In one preferred embodiment of the present teachings, the fluid flow rate of 49 MGD for proximate fluid facility 520 and the fluid flow rate of 79 MGD for distant fluid facility 522 are treated as starting values, used in an iterative process to compute new load values, new modified load values, and ultimately converging on a redirecting instruction, i.e., the amount of fluid flow rate redirected by the flow-directing device between two or more fluid facilities, that minimizes the sum of the total load value and modified total load value.

In the example above where 1MGD is redirected from proximate fluid facility 520 to distant fluid facility 522, fluid flow controller 542 determined the current sum of the total load value and the modified total load value to be 55.22, which is less than the previous value of 55.42. This fluid flow rate adjustment of fluid flow controller 542 minimized the sum of the total load value and the modified total load value. Thus, fluid flow controller 542 may iteratively continue to instruct flow-directing device 524 to adjust fluid flow rates to proximate fluid facility 520 and/or distant fluid facility 522 to minimize the sum of the total load value and the modified total load value.

Example 2

Example 2 is an extension of Example 1, but assumes that fluid flow controller 542 is a proportional-integral-derivative ("PID") controller. PID fluid flow controller 542, as would be the case for FIG. 5 under this assumption, received the total load value and the modified total load value, as explained above in Example 1, and instructed flow-directing device 524 to adjust flow to proximate fluid facility 520 and/or distant fluid facility 522. PID fluid flow controller 542 instructions are based on minimizing the sum of the total load value and the modified total load value. This instruction may be expressed as follows:

Min (total load value)=Min ((fluid flow rate within proximate facility 520)×(load value of proximate facility 520))+((modified fluid flow rate of distant fluid facility 522)×(modified load value of distant facility 522)).

If the relationship between the load value of proximate facility 520 and the modified load value of distant fluid facility are linear, that is if:

load value of proximate fluid facility 520=($A_p$×fluid flow rate within proximate fluid facility 520)+$B_p$, and modified load value of distant fluid facility 522= ($A_d$×modified fluid flow rate within distant facility 522)+$B_d$ where $A_p$, $B_p$, $A_d$, and $B_d$ are real numbers, if this condition is indeed true and a linear relationship exists between flow condition attribute values within a facility and load values of the facility, then Min (total load value) is achieved when:

load value of proximate fluid facility 520−modified load value of distant fluid facility 522=0

To achieve this, PID fluid flow controller 542, having the following definition, may be used:

Flow directing device 524 setting=($K_p$×e)+($K_i$×integral[0,t](e))+($K_d$ de/dt)

Where $K_p$ is a proportional constant, $K_i$ is an integral constant, $K_d$ is a derivative constant, and e=load value−modified load value.

Although illustrative embodiments of the present teachings and arrangements are shown and described in terms of controlling fluid within a sewer system, other modifications, changes, and substitutions are intended. By way of example, certain embodiments discuss processing fluid streams found in sewage systems, but the present teachings and arrangements are not so limited, and extend to any water collection and conveyance systems. Accordingly, it is appropriate that the disclosure be construed broadly and in a manner consistent with the scope of the disclosure, as set forth in the following claims.

What is claimed is:

1. A fluid stream management system comprising:
one or more downstream processing sub-systems, each of which is associated with one or more fluid facilities and comprises:
one or more fluid facility sensors for facilitating determination of one or more flow condition attribute values of one or more of said associated fluid facilities, wherein one of said flow condition attribute values provide information regarding at least one of transport, storage and treatment of one or more of said input fluid streams inside one or more of said associated fluid facilities;
one or more pre-processing flow sensors for facilitating determination of one or more of said flow condition attribute values of one or more of said input fluid streams prior to entering one or more of said associated fluid facilities; and
one or more downstream control devices configured to compute, based on one or more of said flow condition attribute values obtained using one or more of said fluid facility sensors and/or one or more of said pre-processing flow sensors, a load value for each of one or more of said associated fluid facilities, wherein said load value refers to a value related to transport, storage and treatment of a fluid stream inside one of said associated fluid facilities;
one or more upstream processing sub-systems comprise:
one or more flow-directing devices, each of which is configured to direct and/or adjust flow of one or more of said input fluid streams into two or more of said fluid facilities; and one or more upstream processors, each of which is configured to compute a total load value for each of two or more of said fluid facilities, wherein one of said fluid facilities is a proximate fluid facility, which is proximate to one or more of said flow-directing devices and another of said fluid facilities is a distant fluid facility, which is distant to one or more of said flow-directing devices, and wherein said total load value of said proximate fluid facility refers to a product of said load value of said proximate fluid facility and a sum of one or more flow condition attribute values of one or more of said input fluid streams flowing in said proximate fluid facility;
one or more neural networks, each of which comprises:
an input layer that is communicatively coupled to one or more of said fluid facility sensors and/or one or more of said pre-processing flow sensors such that one or more of said flow condition attribute values of one or more of said associated fluid facilities and/or one or more of said flow condition attribute values of one or more of said input fluid streams are received at one or more of said neural networks;
one or more intermediate layers, which based on one or more of said flow condition attribute values obtained using one or more of said fluid facility sensors and/or one or more of said pre-processing flow sensors, is configured to compute one or more modified fluid condition attribute values of one or more of said distant fluid facilities and that account for changes in values of one or more of said fluid condition attributes, as a function of time, of one or more of said distant fluid facilities and of one or more of said input fluid streams entering said distant fluid facilities; and
an output layer that is communicatively coupled to one or more of said downstream control devices such that said one or more of said modified fluid condition attribute values of one or more of said distant fluid facilities is conveyed to one or more of said downstream control devices, which compute, based on one or more of said modified fluid condition attribute values, a modified load value for each of one or more distant fluid facilities; and
wherein one or more upstream control devices calculate, based on said modified load value, a modified total load of each of said distant fluid facilities, and wherein said modified total load refers to a product of said modified load value and a sum of one or more modified fluid condition attributes values of one or more of said input fluid streams flowing into said distant fluid facility; and one or more fluid flow controllers, each of which is coupled to both one or more of said downstream processing sub-systems and one or more of said upstream processing sub-systems and coupled to at least one or more of said flow-directing devices, wherein during an operative state of one or more of said fluid flow controllers, one or more of said fluid flow controllers adjust fluid flow through one or more of said flow-directing devices to minimize a sum of at least one of said total load value of said proximate fluid facility and at least one of said modified total load value of said distant fluid facility.

2. The fluid stream management system of claim 1, wherein at least one of said flow condition attribute value is a value for one attribute selected from a group comprising fluid flow rate, fluid height, fluid volume, hydraulic capacity, time of fluid retention, storage capacity, and fluid quality.

3. The fluid stream management system of claim 1, wherein at least one of said flow-directing device is selected from a group comprising fluid facility, fluid pump station, gate, inflatable dam, weir, and valve.

4. The fluid stream management system of claim 3, wherein two or more flow-directing devices are arranged sequentially such that second of said flow-directing device that is located downstream from first of said flow-directing device and said second of said flow-directing device is deemed as a fluid facility by said downstream control device when computing one or more of said load values and/or one or more of said modified load values for each of said associated fluid facilities.

5. The fluid stream management system of claim 1, at least one of one or more of said fluid facilities is selected from a group comprising storage tank, trunk line, fluid treatment plant, holding pool, reservoir, ocean, and river.

6. The fluid stream management system of claim 1, wherein one or more of said downstream control devices are not integrated with and are discrete from others of said downstream control devices and each of said upstream processors such that wherein one or more of said downstream control devices operate to implement a distributed control scheme, wherein operation of each of said downstream processing sub-systems and associated ones of said fluid facilities are locally controlled by associated ones of said downstream control devices, and are not controlled by any one of a single centralized control mechanism, others of said downstream control devices, or one or more of said upstream processing sub-systems.

7. The fluid stream management system of claim 6, wherein one or more of said downstream control devices compute said load value for each of one or more of said associated fluid facilities, without receiving direct input from said single centralized control mechanism, others of said downstream control devices and each of said upstream processors.

8. The fluid stream management system of claim 6, wherein one or more of said neural networks is collocated with one of one or more of said downstream control devices, wherein one of said downstream control devices receives, from said collocated neural networks, said modified fluid condition attribute values and computes said modified load value for each of said distant fluid facilities.

9. The fluid stream management system of claim 1, further comprising a wireless network, which communicatively couples one or more of said downstream control devices and one or more of said upstream processors, such that said wireless network facilitates transfer of one or more of said load values or of said modified load values from one or more of said downstream control devices to one or more of said upstream processors.

10. The fluid stream management system of claim 1, wherein one or more of said fluid flow controllers are integrated into a single upstream processing sub-system.

11. The fluid stream management system of claim 1, wherein said input layer of said neural network is coupled to a weather forecast information provider, such that one or more of said neural networks receive weather forecast information.

12. The fluid stream management system of claim 1, wherein said input layer and said output layer of said neural network are communicatively coupled through a connection, such that said input layer receives said modified fluid condition attribute values conveyed from said output layer.

13. The fluid stream management system of claim 12, further comprising a fluid management memory, which is coupled to said output layer and said input layer, wherein one or more of said modified fluid condition attribute values obtained from said output layer are stored in said management memory and are subsequently provided to said input layer.

14. The fluid stream management system of claim 12, further comprising a fluid management memory, which is coupled to said input layer and one or more of said fluid facility sensors and/or one or more of said pre-processing flow sensors, wherein during an operative state of said fluid stream management system, historical fluid condition attribute values, obtained from one or more of said fluid facility sensors and/or one or more of said pre-processing flow sensors, are subsequently received at said input layer.

15. The fluid stream management system of claim 1, wherein said fluid facility sensors include at least one sensor selected from a group comprising level sensors, flow meters, thermometer, dissolved oxygen sensor, pH level sensor, conductivity sensor, oxidation reduction potential sensor, *E. coli* count sensor, total organic carbon level sensor, nitrate level sensor, phosphorus level sensor, bacteria count sensor.

16. The fluid stream management system of claim 1, wherein said pre-processing flow sensors include at least one sensor selected from a group comprising level sensors, flow meters, thermometer, dissolved oxygen sensor, pH level sensor, conductivity sensor, oxidation reduction potential sensor, *E. coli* count sensor, total organic carbon level sensor, nitrate level sensor, phosphorus level sensor, bacteria count sensor.

17. The fluid stream management system of claim 1, wherein one of said fluid flow controllers is a proportional integral derivative controller that adjusts flow through a valve, which functions as said flow-directing device, to minimize a sum of at least one of said total load value of said proximate fluid facility and at least one of said modified total load value of said distant fluid facility.

18. A method for controlling transport of a fluid stream, said method comprising:
receiving, using a distant fluid facility sensor, a distant flow condition attribute value for a distant fluid facility;
receiving, using a proximate fluid facility sensor, a proximate flow condition attribute value for a proximate fluid facility, which is proximate to a flow-directing device relative to said distant fluid facility;
receiving, using one or more pre-processing flow sensors, a pre-processing flow condition attribute value for one or more input fluid streams entering said distant fluid facility;

calculating, using a downstream control device and based upon said proximate flow condition attribute value, a load value of said proximate fluid facility;

determining, using an upstream processor, a total load value for said proximate fluid facility, which refers to a product of said load value of said proximate fluid facility and a sum of one or more of said fluid condition attributes values of one or more of said input fluid streams flowing into said proximate fluid facility;

computing, using said upstream processor, a modified total load value for said distant fluid facility, which refers to a product of said load value of said distant fluid facility and a sum of one or more of said modified fluid condition attributes values of one or more of said input fluid streams flowing into said distant fluid facility; and adjusting, using a fluid flow controller that is communicatively coupled to a flow-directing device, fluid flow through said flow directing device to minimize a sum of said total load value of said proximate fluid facility and said modified total load value of said distant fluid facility.

19. The method for controlling transport of a fluid stream of claim 18, further comprising receiving, from a weather forecast information provider, weather forecast information, wherein said weather forecast information is used in arriving at said modified flow condition attribute value for said distant fluid facility.

20. The method for controlling transport of a fluid stream of claim 18, further comprising receiving one or more historical modified fluid condition attribute values, wherein one or more of said historical modified fluid condition attribute values are used in arriving at said modified flow condition attribute value for said distant fluid facility.

21. The method for controlling transport of a fluid stream of claim 18, further comprising receiving one or more historical distant fluid condition attribute values and/or distant pre-processing flow condition attribute values, wherein one or more of said historical fluid condition attribute values are used in arriving at said modified flow condition attribute value for said distant fluid facility.

22. A method for controlling transport of a fluid stream, said method comprising:

receiving, using a distant fluid facility sensor, a distant flow condition attribute value for a distant fluid facility;

receiving, using a proximate fluid facility sensor, a proximate flow condition attribute value for a proximate fluid facility, which is proximate to a flow-directing device relative to said distant fluid facility;

receiving, using one or more pre-processing flow sensors, a preprocessing flow condition attribute value for one or more input fluid streams entering said distant fluid facility;

calculating, using a downstream control device and based upon said proximate flow condition attribute value, a load value of said proximate fluid facility;

arriving, using a neural network and based upon said distant flow condition attribute value and said distant pre-process flow condition attribute value, at a modified flow condition attribute value for said distant fluid facility and that accounts for changes in values of fluid condition attributes, as a function of time, of said distant fluid facility and of one or more of said input fluid streams entering said distant fluid facility;

calculating, using a downstream control device and based upon said modified flow condition attribute value, a modified load value of said distant fluid facility;

adjusting, using a fluid flow controller that is designed to be communicatively coupled to flow-directing device, fluid flow through flow directing device to minimize a sum of said load value of said proximate fluid facility and said modified load value of said distant fluid facility; and wherein said calculating said load value of said proximate fluid facility, includes computing a sum of a proximate fluid facility intermediate value and $B_p$, wherein said proximate fluid facility intermediate value is a product of $A_p$ and said flow condition attribute values within said proximate fluid facility, and wherein said $A_p$ and $B_p$ are real numbers.

23. The method of claim 22, wherein said calculate said modified load value of said distant fluid facility, includes computing a sum of a distant fluid facility intermediated value and $B_d$, wherein said distant fluid facility intermediate value is a product of $A_d$ and said flow condition attribute values within said distant fluid facility, and wherein $A_d$ and $B_d$ are real numbers.

24. The method of claim 22, wherein said adjusting includes computing:

$(K_p \times e) + (K_i \text{ integral}[0,t](e)) + (K_d de/dt)$,

Wherein said $K_p$ is a proportional constant, said $K_i$ is an integral constant, said $K_d$ is a derivative constant, and wherein e equals the difference between said load value of said proximate fluid facility and said modified load value of said distant fluid facility.

25. The method of claim 22, wherein said adjusting includes redirecting input fluid streams such that said load value of said proximate fluid facility equals said modified load value of said distant fluid facility.

* * * * *